US009521448B2

(12) United States Patent
Thomas et al.

(10) Patent No.: US 9,521,448 B2
(45) Date of Patent: *Dec. 13, 2016

(54) SYSTEMS AND METHODS FOR EXPORTING DIGITAL CONTENT USING AN INTERACTIVE TELEVISION APPLICATION

(71) Applicant: Rovi Guides, Inc., Santa Clara, CA (US)

(72) Inventors: William L. Thomas, Evergreen, CO (US); Thomas E. Westberg, Stow, MA (US); Brian Fife, Concord, MA (US); Joseph DiGiovanni, Cherry Hill, NJ (US); Michael D. Ellis, Boulder, CO (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/602,146

(22) Filed: Jan. 21, 2015

(65) Prior Publication Data

US 2015/0135251 A1    May 14, 2015

Related U.S. Application Data

(60) Continuation of application No. 12/212,876, filed on Sep. 18, 2008, now Pat. No. 8,966,567, which is a
(Continued)

(51) Int. Cl.
*H04N 7/173* (2011.01)
*H04N 21/418* (2011.01)
(Continued)

(52) U.S. Cl.
CPC ......... *H04N 21/4184* (2013.01); *G11B 27/034* (2013.01); *G11B 27/34* (2013.01);
(Continued)

(58) Field of Classification Search
USPC .................. 725/134, 142; 386/200, 278, 326
See application file for complete search history.

(56) References Cited

U.S. PATENT DOCUMENTS 5,900,608 A   5/1999  Iida
5,926,624 A   7/1999  Katz et al.
(Continued)

FOREIGN PATENT DOCUMENTS

EP    0 848 383    6/1998
EP    0 936 774    8/1999
(Continued)

OTHER PUBLICATIONS

"IPlod,iTunes ReadMe," Readme Files Apple, Aug. 13, 2003.
(Continued)

*Primary Examiner* — Yassin Alata
(74) *Attorney, Agent, or Firm* — Ropes & Gray LLP

(57) ABSTRACT

The present invention relates to methods and systems for extracting digital content using an interactive television application. The interactive television application may allow the user to record programs on a set-top box. The interactive television application may also allow the user to extract the audio from one of the recorded programs and transfer the extracted audio to removable media (e.g., a CD-R). The interactive television application also be configured to perform a future transfer of digital content to removable media. The future transfer may occur without requiring any further user interaction.

18 Claims, 12 Drawing Sheets

Related U.S. Application Data division of application No. 10/942,070, filed on Sep. 15, 2004, now abandoned.

(60) Provisional application No. 60/502,920, filed on Sep. 15, 2003.

(51) Int. Cl.

| | | |
|---|---|---|
| *G11B 27/034* | (2006.01) | |
| *G11B 27/34* | (2006.01) | |
| *H04N 5/76* | (2006.01) | |
| *H04N 21/2368* | (2011.01) | |
| *H04N 21/41* | (2011.01) | |
| *H04N 21/4147* | (2011.01) | |
| *H04N 21/426* | (2011.01) | |
| *H04N 21/433* | (2011.01) | |
| *H04N 21/434* | (2011.01) | |
| *H04N 21/439* | (2011.01) | |
| *H04N 21/4402* | (2011.01) | |
| *H04N 21/442* | (2011.01) | |
| *H04N 21/4627* | (2011.01) | |
| *H04N 21/472* | (2011.01) | |
| *G11B 20/00* | (2006.01) | |
| *H04N 5/765* | (2006.01) | |
| *H04N 5/775* | (2006.01) | |
| *H04N 5/781* | (2006.01) | |
| *H04N 5/85* | (2006.01) | |
| *H04N 9/804* | (2006.01) | |

(52) U.S. Cl.
CPC .......... *H04N 5/76* (2013.01); *H04N 21/2368* (2013.01); *H04N 21/4135* (2013.01); *H04N 21/4147* (2013.01); *H04N 21/42646* (2013.01); *H04N 21/42669* (2013.01); *H04N 21/439* (2013.01); *H04N 21/4334* (2013.01); *H04N 21/4341* (2013.01); *H04N 21/4394* (2013.01); *H04N 21/4398* (2013.01); *H04N 21/4402* (2013.01); *H04N 21/44231* (2013.01); *H04N 21/4627* (2013.01); *H04N 21/47214* (2013.01); *G11B 20/00173* (2013.01); *G11B 20/00731* (2013.01); *G11B 2220/218* (2013.01); *G11B 2220/2545* (2013.01); *H04N 5/765* (2013.01); *H04N 5/775* (2013.01); *H04N 5/781* (2013.01); *H04N 5/85* (2013.01); *H04N 9/8042* (2013.01)

(56) References Cited

U.S. PATENT DOCUMENTS

| | | |
|---|---|---|
| 5,956,716 A | 9/1999 | Kenner et al. |
| 5,959,945 A | 9/1999 | Kleiman |
| 6,141,488 A | 10/2000 | Knudson et al. |
| 6,324,544 B1 | 11/2001 | Alam et al. |
| 6,608,993 B1 | 8/2003 | Ficco |
| 6,728,713 B1 | 4/2004 | Beach et al. |
| 6,931,198 B1 | 8/2005 | Hamada et al. |
| 7,242,856 B2 | 7/2007 | Ishida et al. |
| 7,337,459 B1 | 2/2008 | Tsutsui et al. |
| 7,487,226 B2 | 2/2009 | Blair et al. |
| 2002/0040475 A1 | 4/2002 | Yap et al. |
| 2002/0056118 A1 | 5/2002 | Hunter et al. |
| 2002/0069252 A1 | 6/2002 | Jones et al. |
| 2002/0069418 A1 | 6/2002 | Philips |
| 2002/0174433 A1 | 11/2002 | Baumgartner et al. |
| 2003/0017826 A1 | 1/2003 | Fishman et al. |
| 2003/0093790 A1 | 5/2003 | Logan et al. |
| 2003/0106068 A1 | 6/2003 | Ishida et al. |
| 2003/0149988 A1 | 8/2003 | Ellis et al. |
| 2003/0163823 A1 | 8/2003 | Logan et al. |
| 2004/0095516 A1* | 5/2004 | Rohlicek .................. 348/838 |
| 2004/0103434 A1 | 5/2004 | Ellis |
| 2004/0107447 A1 | 6/2004 | Katagishi et al. |
| 2004/0237104 A1 | 11/2004 | Cooper et al. |
| 2006/0020971 A1 | 1/2006 | Poslinski |
| 2009/0013348 A1 | 1/2009 | Thomas et al. |
| 2010/0192192 A1 | 7/2010 | Thomas et al. |

FOREIGN PATENT DOCUMENTS

| | | |
|---|---|---|
| EP | 1 087 619 | 3/2001 |
| EP | 1 126 643 | 8/2001 |
| JP | 2002-100122 A | 4/2002 |
| JP | 2002-140541 A | 5/2002 |
| JP | 2002-298551 A | 10/2002 |
| JP | 2003-032620 A | 1/2003 |
| WO | WO-01/38993 A1 | 5/2001 |
| WO | WO-02078317 A2 | 10/2002 |
| WO | WO-03036541 A1 | 5/2003 |
| WO | WO-03043326 A1 | 5/2003 |
| WO | WO-2005/029843 | 3/2005 |

OTHER PUBLICATIONS

Reynolds, K.Y. et al., "Multiplexing and Demultiplexing Digital Audio and Video in Today's Digital Environment," SMPTE Journal, vol. 102, No. 10, pp. 905-909, Oct. 1993.
Sonic Foundry, Inc., Sound Forge 6.0 User Manual, 2002. http://www.sonycreativesoftware.com/download/manuals/soundforgefamily.
Office Action U.S. Appl. No. 12/751,315, dated Aug. 22, 2011.
Office Action U.S. Appl. No. 12/212,876 , dated Aug. 8, 2011.
Office Action U.S. Appl. No. 12/212,876, dated Mar. 2, 2011.
Office Action U.S. Appl. No. 12/212,876, dated Sep. 18, 2008.
Office Action U.S. Appl. No. 12/212,876 , dated Nov. 28, 2011.
Office Action U.S. Appl. No. 12/212,876 , dated Sep. 13, 2010.

* cited by examiner

FIG. 9

SYSTEMS AND METHODS FOR EXPORTING DIGITAL CONTENT USING AN INTERACTIVE TELEVISION APPLICATION

CROSS REFERENCE TO RELATED APPLICATIONS

This application is a continuation of, and claims priority to and benefit of, U.S. patent application Ser. No. 12/212,876, filed Sep. 18, 2008 (currently allowed) which is a divisional application of U.S. patent application Ser. No. 10/942,070, filed Sep. 15, 2004 (now abandoned), which claims the benefit of the U.S. provisional patent application No. 60/502,920, filed Sep. 15, 2003. All these prior applications are hereby incorporated by reference in their entireties.

BACKGROUND OF THE INVENTION

This invention relates to interactive television applications and more particularly to interactive television applications with digital content exporting features.

An interactive television application, such as an interactive program guide, may allow a user to store digital content (e.g., record a program) on a set-top box. The user may access the stored digital content using the interactive television application. However, in some cases, the user may wish to be able to access the digital content away from the interactive television application (e.g., while running or traveling).

In some cases, the nature of the stored digital content (e.g., a recorded program) is such that the audio content may be of greater interest to users. Such digital content may include, for example, a recording of the evening news, a recording of a stand-up comedy routine, or a recording of a sports broadcast (e.g., football). Furthermore, the user may wish to access this audio content away from the interactive television application. For example, the user may wish to listen to the audio of a talk show while jogging.

Therefore, it may be desirable to provide an interactive television application that is capable of extracting audio from recorded programs and transferring the extracted audio to a removable medium (e.g., a CD-R).

The user may also wish to transfer digital content (e.g., a recorded program) to removable media (e.g., a compact flash card). For example, the user may wish to view yesterday's news broadcast on a handheld computer while commuting to work in the morning. It may be burdensome for the user to repeatedly setup transfers using the interactive television application (i.e., selecting digital content, selecting settings, etc.).

Therefore, it may be desirable to provide an interactive television application that may be configured to perform a future transfer of digital content to removable media. After the user has configured the interactive television application to perform a future transfer of digital content to removable media, it may also be desirable to perform the future transfer of digital content to the removable medium without requiring any further user interaction.

SUMMARY OF THE INVENTION

An interactive television application may be provided in accordance with the present invention. The interactive television application may allow a user to store digital content on a set-top box or access digital content stored remotely (e.g., a remote server).

In one aspect of the invention, the interactive television application may be capable of extracting audio from a recorded program and transferring the extracted audio to removable media.

The interactive television application may allow the user to select a recorded program from which audio may be extracted. Recorded programs may include, for example, recordings of television programs, a program stored on a live buffer, and a program currently being recorded. The user may select a removable medium and the interactive television application may transfer the extracted audio to the selected removable medium.

The interactive television application may allow the user to select an audio format and audio quality. The user may select an audio format that is compatible with a music player on which the audio is to be played. The user may wish to select an audio quality based on the nature of the audio. For example, if the audio of the selected program is mainly speech, the user may wish to select a lower audio quality. If the audio of the selected program is music, the user may wish to select a higher audio quality. The audio quality may also be related to the size of the extracted audio. Therefore, if the target medium has a small capacity, the user may select a lower quality for the extracted audio.

In some cases, the user may instruct the interactive television application to extract audio from the entire recorded program. In other cases, the user may instruct the interactive television application to extract audio from portions of the recorded program. For example, the user may set start and end markers on a progress bar to extract audio from segments of the recorded program. The interactive television application may allow the user to preview the audio at points along the recording. The interactive television application may display a marker on the progress bar to allow the user to identify the location of the audio in the program. The user may select start and end markers based on the previewed audio.

After the user has selected the settings for audio extraction, the interactive television application may extract the audio from the interactive television application. For example, the interactive television application may split the selected program into the segments indicated by the user. The interactive television application may de-multiplex the segments of the program and split the program into an audio file and a video file. The interactive television application may process the resulting audio file in accordance with the user's format and quality settings.

The interactive television application may supplement the file with program information to allow a music player to display, for example, title and artist information while playing the audio. The program information may be derived from, for example, program listings, program guide information, metadata embedded in the broadcast stream of the program, or information entered by the user.

The interactive television application may verify that the selected removable medium has enough capacity to store the audio file and the interactive television application may transfer the audio file to the selected target medium.

The interactive television application may also allow the user to schedule a recording of audio from a program. For example, the user may select a program and then select options for recording the audio of the program (e.g., removable medium, audio format, and audio quality). When the program is broadcast, the interactive television application may record the audio of the program on the selected removable medium in accordance with the format and quality settings.

In another aspect of the present invention, the interactive television application may also be configured to perform future transfers of digital content to removable media. After the user has configured the interactive television application to perform a future transfer of digital content to removable media, the future transfer may occur without requiring any further user interaction. For example, the user may configure the interactive television application to transfer the most recent recording of a news program to a Compact Flash (CF) card whenever it is inserted into set-top box 60. The user may, for example, insert the Compact Flash card into set-top box 60 every morning to retrieve the news program for that day and view the news program on a handheld device while riding the train to work. Because the transfer has already been set up, the user is not burdened with the task of repeatedly setting up the transfer every morning.

In order to set up a future transfer of digital content to removable media, the interactive television application may allow the user to identify digital content using the interactive television application. For example, the user may select a series recording of the evening news.

In addition, in order to set up a future transfer of digital content to removable media, the interactive television application may allow the user to select settings for the removable media. The settings may include the format and quality of the digital content. In some cases, the user may wish to view the digital content on a handheld device that is only capable of playing video in certain formats and the user may select one of the compatible formats. In some cases, the user may wish to conserve storage space on removable media and the user may select the lowest quality setting. In some cases, if the digital content is a video, the user may select a quality setting (e.g., 320×240) in order to match the resolution of the digital content to the native resolution of a device on which the digital content is to be played (e.g., a handheld video player).

The settings may also include settings for recurring digital content (e.g., series recordings). For example, the user may instruct the interactive television application to transfer only the most recent recording in a series to removable media. In another example, the user may instruct the interactive television application to transfer all recordings in a series that have yet to be transferred to removable media.

The settings may also include settings for updating digital content on removable media. For example, the user may instruct the interactive television application to delete or overwrite digital content only if it is older than a user-specified number of days. In another example, the user may instruct the interactive television application to delete or overwrite digital content only if it has been viewed.

The interactive television application may also determine the types of removable media to which the digital content may be transferred. For example, digital content may be transferred to all removable media if it is fairly small in size (i.e., the digital content may fit on even the smallest removable medium). In another example, digital content which is fairly large may be restricted to removable media with at least a certain capacity (e.g., 4.7 GB).

The interactive television application may store a reference to the selected digital content and the selected settings for transferring the selected digital content to removable media. In some embodiments, the reference to the selected digital content and the selected settings for transferring the selected digital content may be stored in a database. In some embodiments, the reference to the selected digital content and the selected settings for transferring the selected digital content may be stored on a configuration file stored on removable media.

After the user has configured the interactive television application to perform a future transfer of digital content to removable media, the future transfer may occur without requiring any further user interaction. To initiate the transfer of digital content, the interactive television application may establish communications with removable medium 62. For example, communications may be established after the user inserts the removable medium in the set-top box. In another example, communications may be established over a wireless link. For example, the removable medium may be moved in close proximity to a wireless access point coupled to (or part of) the set-top box.

At this point, the interactive television application may determine whether the removable medium is a valid target. Determining whether the removable medium is a valid target may occur without requiring any user interaction.

In some embodiments, the interactive television application may access the database to determine whether the settings for the removable medium are stored on the database. For example, the interactive television application may determine the identifier for the removable medium and check the database to see if any entries are stored in the database under the identifier for the removable medium. Identifiers may include, for example, volume numbers and capacities. The interactive television application may determine that the removable medium is a valid target if its settings are stored in the database.

In some embodiments, the interactive television application may access the configuration file stored on the removable medium. If the interactive television application recognizes the settings stored on the configuration file, then the interactive television application may assume that the removable medium is a valid target.

The interactive television application may retrieve a reference to digital content and settings for transferring the digital content for the removable medium by accessing either the database or the configuration file. The interactive television application may transfer the referenced digital content to the removable medium in accordance with the settings for the removable medium. The transfer may occur without requiring any further user interaction.

Further features of the invention, its nature and various advantages will be more apparent from the accompanying drawings and the following detailed description of the preferred embodiments.

BRIEF DESCRIPTION OF THE DRAWINGS

FIG. 9 is an illustrative screen for configuring the interactive television application to perform future transfers of digital content to removable media in accordance with the present invention.

DETAILED DESCRIPTION OF THE PREFERRED EMBODIMENTS

Figure 1:
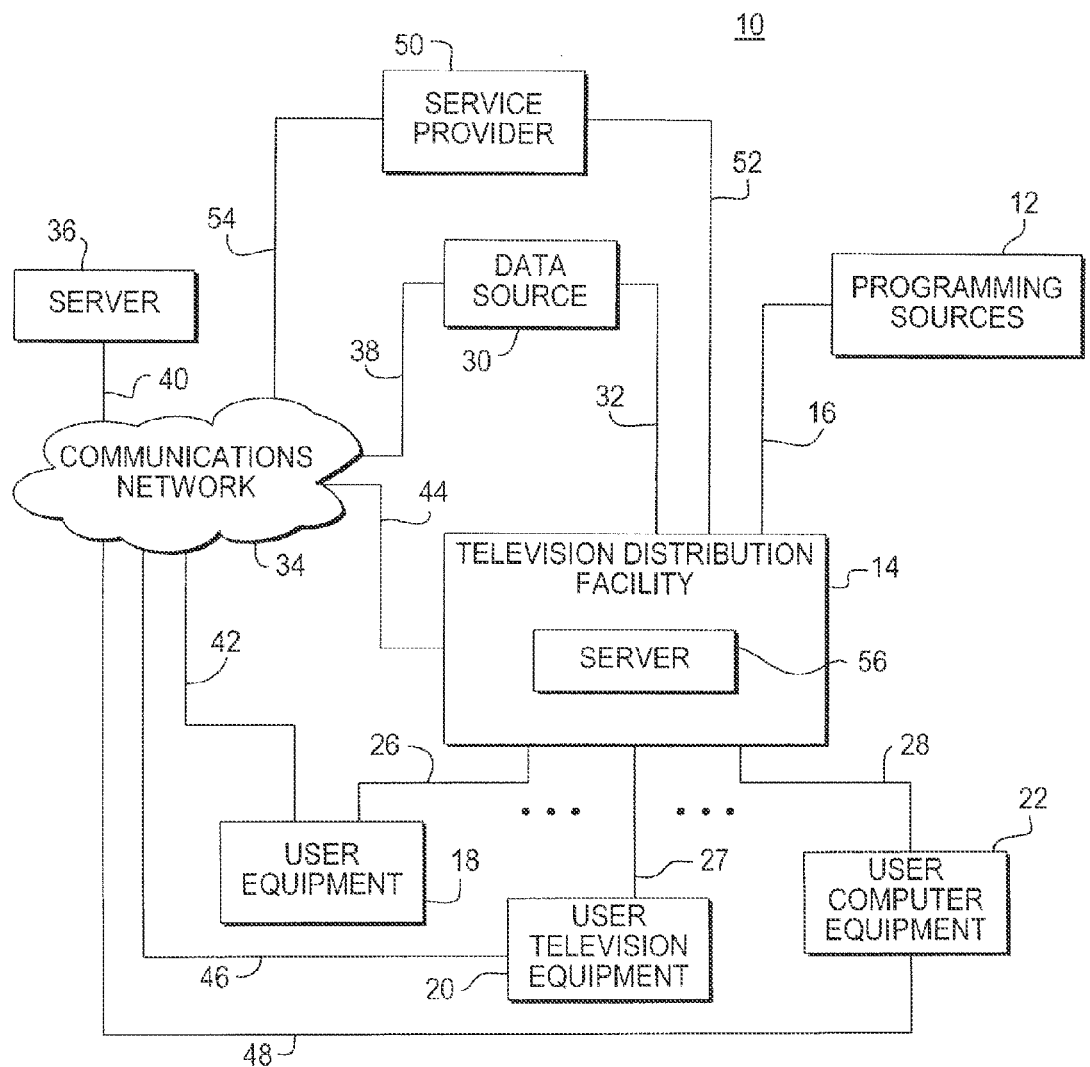
FIG. 1 is a diagram of an illustrative interactive television application system in accordance with the present invention.

An illustrative interactive television application system 10 in accordance with an embodiment of the present invention is shown in FIG. 1. Content such as television programming and digital music may be provided from programming sources 12 to television distribution facilities such as television distribution facility 14 using communications path 16. Programming sources 12 may be any suitable sources of television and music programming, such as television and music production studios, etc.

Television distribution facility 14 may be a cable system headend, a satellite television distribution facility, a television broadcast facility, or any other suitable facility for distributing television and music programming to users. There are typically numerous television distribution facilities 14 in system 10, but only one is shown in FIG. 1 to avoid overcomplicating the drawings.

Communications path 16 may be a satellite path, a fiber-optic path, a cable path, or any other suitable wired or wireless communications paths or a combination of such paths.

Television distribution facility 14 may be connected to various user equipment devices 18. Such user equipment 18 may, for example, be located in the homes of users. User equipment 18 may include user television equipment 20 or user computer equipment 22.

The user equipment may receive television and music programming and other information from television distribution facility 14 over communications paths such as communications paths 26, 27, and 28. The user equipment may also transmit signals to television distribution facility 14 over paths 26, 27, and 28. Paths 26, 27, and 28 may be cables or other wired connections, free-space connections (e.g., for broadcast or other wireless signals), satellite links, etc.

Data source 30 may include a program listings database that is used to provide television program schedule information such as scheduled broadcast times, titles, channels, ratings information (e.g., parental ratings and critic's ratings), detailed title descriptions, genre or category information (e.g., sports, news, movies, etc.), information on actors and actresses, running times, etc. Data source 30 may also be used to provide advertisements (e.g., program guide advertisements and advertisements for other interactive television applications), real-time data such as sports scores, stock quotes, news, weather, etc. Although data source 30 is drawn as an individual box in FIG. 1, data source 30 and the other system components of FIG. 1 may be provided using equipment at one or more locations. Systems components are drawn as single boxes in FIG. 1 to avoid over-complicating the drawings.

Data source 30 may provide program schedule information and other data to television distribution facility 14 over communications path 32 for distribution to the associated user equipment over paths 26, 27, and 28. Communications path 32 may be any suitable communications path such as a satellite communications path or other wireless path, a fiber-optic or other wired communications path, a path that supports Internet communications, a combination of such paths, etc. Data source 30 may provide program schedule information and other data to the user at user equipment 18 over path 38, communications network 34, and path 42. Path 42 may be a wired path such as a telephone line, a cable path, a fiber-optic path, a satellite path, a wireless path, a combination of such paths, or any other suitable path.

User equipment devices such as user television equipment and personal computers may use the program schedule information to display program listings and information on media, such as, for example, digital music for the user. An interactive television application or other suitable application may be used to display such information on the user's display.

An on-line program guide and other interactive television services may be provided using a server connected to communications network 34 such as server 36. Server 36 may receive program schedule information and other data from data source 30 via communications path 38, communications network 34, and communications path 40. Paths 38 and 40 may be satellite paths, fiber-optic paths, wired paths, etc. Communications network 34 may be any suitable communications network, such as the Internet, the public switched telephone network, a packet-based network, etc.

User equipment 18 may access on-line program guide information and other information from server 36 via communications path 42. User equipment 18 may also access the on-line program guide and other services on server 36 via communications path 26, television distribution facility 14, and communications path 44. For example, a cable modem or other suitable equipment may be used by user equipment 18 to communicate with television distribution facility 14. Television distribution facility 14 may communicate with communications network 34 over any suitable path 44, such as a wired path, a cable path, fiber-optic path, satellite path, a combination of such paths, etc.

User equipment such as user television equipment 20 and user computer equipment 22 may access the on-line program guide and server 36 using similar arrangements. User television equipment 20 may access the on-line program guide and server 36 using communications path 46 or using path 27, television distribution facility 14, and path 44. User computer equipment 22 may access the on-line program guide and server 36 using communications path 48 or using path 28, television distribution facility 14, and path 44. Paths 46 and 48 may be any suitable paths, such as wired paths, cable paths, fiber-optic paths, wireless paths, satellite paths, a combination of such paths, etc.

The data distribution technique that is used to distribute data to user television equipment 20 on either of paths 27 or 46 may depend on the type of information that is being distributed. For example, text and graphics may be distributed over an out-of-band channel using an out-of-band modulator, distributed using a digital-in-band channel, or distributed in the vertical blanking interval lines of one of the channels. Video information may also be distributed in this way, although large quantities of video information may be more efficiently distributed using one or more digital channels or streams on paths 27 or 46. Such digital channels or streams may also be used for distributing text and graphics.

Program guide application functions and the functions of other interactive television applications may be supported using server 36 and other servers connected to communications network 34 such as server 56. Interactive television applications may also be supported by servers or other suitable equipment at one or more service providers such as service provider 50. For example, a home shopping service may be supported by a service provider such as service provider 50 that has sales representatives, order fulfillment facilities, account maintenance facilities, and other equipment for supporting interactive home shopping features. A home shopping application that is implemented using the user equipment may be used to access the service provider to provide these features to the user. The user equipment may access service provider 50 via television distribution facility 14 and communications path 52 or via communications network 34 and communications path 54. Communications paths such as paths 52 and 54 may be any suitable paths, such as wired paths, cable paths, fiber-optic paths, satellite paths, a combination of such paths, etc.

Another example of an interactive television application is a home banking application. A home banking service may be supported using personnel at facilities such as service provider 50. An interactive home banking application that is implemented using the user equipment may access the home banking service via television distribution facility 14 and communications path 52 or via communications network 34 and communications path 54.

If desired, an interactive television application such as a network-based video recorder or a video-on-demand application may be supported using server 56, server 36, or equipment at service provider 50. Video-on-demand content and video recorded using a network-based video recorder arrangement may be stored on server 56 or server 36 or at service provider 50 and may be provided to the user equipment when requested by users. An interactive television application may be used to support the functions of a personal video recorder (sometimes called a digital video recorder) that is implemented using user equipment 18. Illustrative equipment that may be used to support personal video recorder functions include specialized personal video recorder devices, integrated receiver decoders (IRDs), set-top boxes with integrated or external hard drives, or personal computers with video recording capabilities.

If desired, applications such as the interactive television application, a home shopping application, a home banking application, a video-on-demand application, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping, network-based video recorder functions, personal video recorder functions, navigational functions, program guide functions, communications functions, and other suitable functions may be provided using one application or any other suitable number of applications.

Moreover, the interactive television application, the home banking application, the home shopping application, the network-based video recorder and personal video recorder applications, the video-on-demand application, the gaming applications, communications applications, and navigational applications, are only a few illustrative examples of the types of interactive television applications that may be supported by system 10. Other suitable applications that may be supported include, news services, web browsing and other Internet services, and interactive wagering services (e.g., for wagering on horse races and the like).

The interactive television application or applications that are used in interactive television system 10 may be implemented locally on the user equipment. The applications may also be implemented in a distributed fashion (e.g., using a client-server architecture in which the user equipment serves at least partly and for at least some of the time, as the client and a server such as server 56 at television distribution facility 14, server 36, or other suitable equipment acts as the server. Other distributed architectures may also be used if desired. Moreover, some or all of the interactive television system features of system 10 may be provided using operating system software or middleware software. Such operating system software and middleware may be used instead of or in combination with application-level software. Regardless of the particular arrangement used to implement interactive television features related to program guides, home shopping, home banking, video-on-demand, Internet, communications, etc., the software that supports these features may be referred to as an application or applications.

Figure 2:
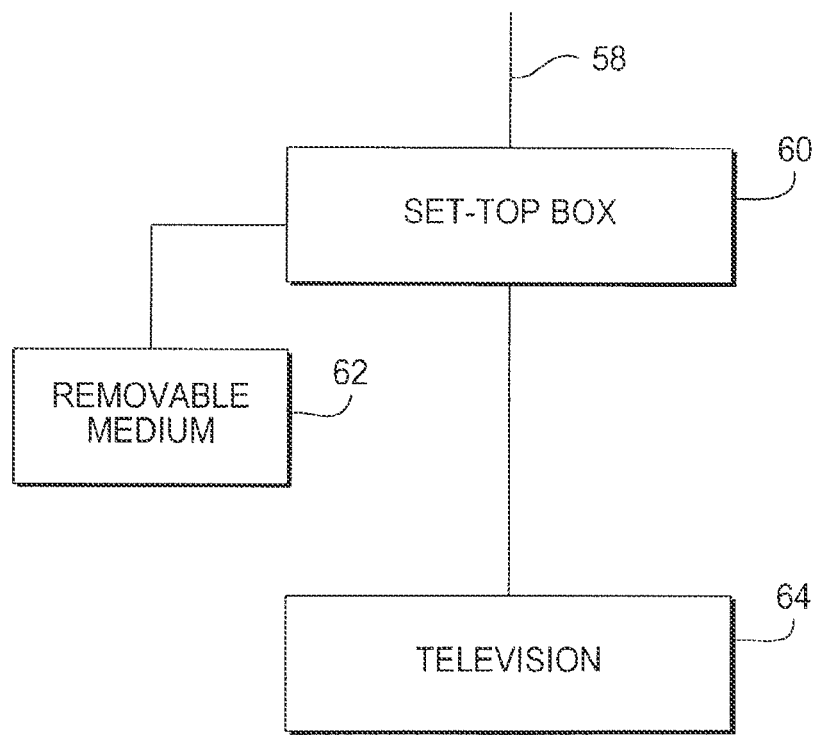
FIG. 2 is a diagram of illustrative user television equipment in accordance with the present invention.

Illustrative user television equipment 20 that is based on a set-top box arrangement is shown in FIG. 2. Input/output 58 may be connected to communications paths such as paths 27 and 46. Input/output functions may be provided by one or more wires or communications paths, but are shown as a single path in FIG. 2 to avoid overcomplicating the drawing. Television programming and other information may be received using input/output 58. Commands and requests and other information from the user may also be transmitted over input/output 58.

Set-top box 60 may contain an analog tuner for tuning to a desired analog television channel. Set-top box 60 may also contain digital decoding circuitry for receiving digital television and music channels. Both analog and digital channels may be handled together if desired. Multiple tuners may be provided (e.g., to handle simultaneous watch and record functions). Box 60 may be an integrated receiver decoder (IRD) that handles satellite television. If desired, box 60 may have circuitry for handling cable, over-the-air broadcast, and satellite content. Box 60 may include a storage device (e.g., a digital storage device such as a hard disk drive) for providing recording capabilities. Box 60 may also be connected to a recording device 62 such as a video cassette recorder, personal video recorder, or other device or devices with storage capabilities.

Set-top box 60 contains a processor (e.g., a microcontroller or microprocessor or the like) that is used to execute software applications. Set-top box 60 may contain memory such as random-access memory for use when executing applications. Nonvolatile memory may also be used (e.g., to launch a boot-up routine and other instructions). Hard disk storage in box 60 or in recording device 62 may be used to back up data and to otherwise support larger databases and storage requirements than may be supported using random-access memory approaches.

Set-top box 60 may have infrared (IR) or other communications circuitry for communicating with a remote control or wireless keyboard. Set-top box 60 may also have dedicated buttons and a front-panel display. The front-panel display may, for example, be used to display the current channel to which the set-top box is tuned.

Set-top box 60 may also have communications circuitry such as a cable modem, an integrated services digital network (ISDN) modem, a digital subscriber line (DSL) modem, a telephone modem, wireless modem, etc. for communications with other equipment. Such communications may involve the Internet or any other suitable communications networks or paths. If desired, the components of set-top box 60 may be integrated into other user equipment (e.g., a television or videocassette recorder).

Set-top box 60 may be controlled using a remote control or other suitable user interface. Video recorder functions such as start, stop, record, etc. and other functions may be controlled by set-top box 60.

The output of set-top box 60 may be provided to television 64 for display to the user. Any suitable television or monitor may be used to display the video. In the equipment of FIG. 2 and the other equipment of system 10, the audio associated with various video items is typically distributed with those video items and is generally played back to the user as the videos are played.

Set-top box 60 may have access to additional storage provided by one or more removable media (e.g., removable medium 62). Removable media may include, for example, optical discs (e.g., DVD-RAM, DVD-R, DVD-RW, CD-R, CD-RW, MD, etc.), solid-state memory (e.g., Compact Flash, Secure Digital, Multimedia Card, xD, Memory Stick™, USB flash drive, etc.), magnetic storage (e.g., USB hard disk, Microdrive™, hard disk, floppy disk, tape, etc.), or any other suitable removable medium. Set-top box 60 may include circuitry for reading from and writing to removable medium 62.

In some embodiments, set-top box 60 may be connected to a removable media access device, into which removable medium 62 may be inserted. For example, if set-top box 60 does not have a slot for inserting compact flash cards, a compact flash card may be inserted into the removable media access device.

In some embodiments, removable medium 62 may a part of a removable media access device (e.g., a camera, a portable music player, a cellular phone, a personal digital assistant, a camcorder, etc.). The removable media access device may be connected to set-top box 60 using, for example, a USB cable, a serial cable, or a FireWire™ cable to allow set-top box 60 to access removable medium 62. The removable media access device may also be connected to set-top box 60 using a cradle or a dock.

In some embodiments, set-top box 60 and removable medium 62 may be configured to communicate wirelessly with one another. Set-top box 60 and removable medium 62 may each include additional circuitry for performing wireless communication. For example, a wireless link may be established when removable medium 62 is moved in close proximity to set-top box 60. Set-top box 60 and removable medium 62 may communication using a wireless protocol, such as, for example, Bluetooth™, Wi-Fi™, WiMAX™, or any other suitable wireless protocol.

The set-top box arrangement of FIG. 2 is merely illustrative. Other arrangements may be used if desired. For example, user television equipment may be based on a WebTV™ box, a personal computer television (PC/TV), or any other suitable television equipment arrangement. If desired, the functions of components such as enhanced set-top box 60, a WebTV™ box, or PC/TV or the like may be integrated into a television or personal computer or other suitable device.

Figure 3:
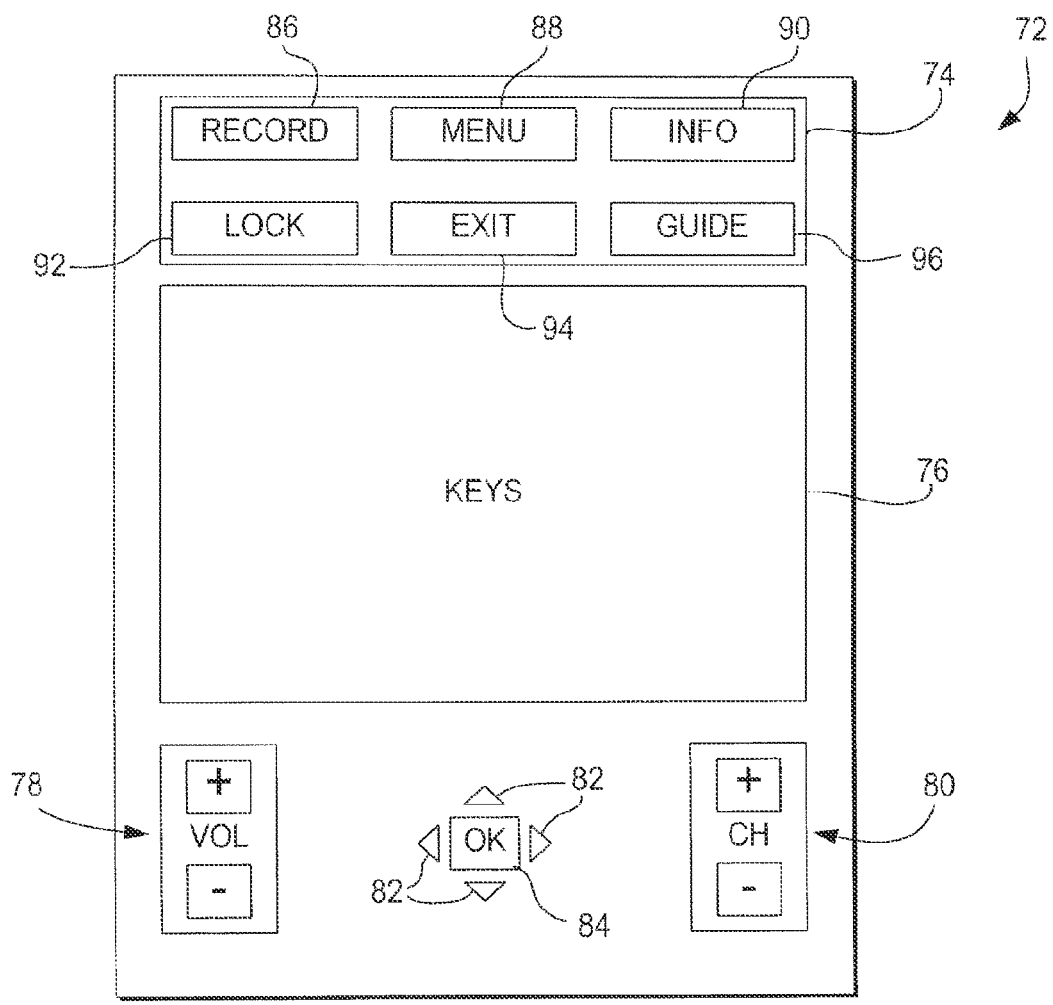
FIG. 3 is a diagram of an illustrative remote control in accordance with the present invention.

An illustrative remote control 72 for operating user television equipment 20 (or suitable user computer equipment 22) is shown in FIG. 3. Remote control 72 may have function keys 74 and other keys 76 such as keypad keys, power on/off keys, pause, stop, fast-forward and reverse keys, etc. Volume up and down keys 78 may be used for adjusting the volume of the audio portion of a video. Channel up and down keys 80 may be used to change television channels and to access content on virtual channels. Cursor keys 82 may be used to navigate on-screen menus. For example, cursor keys 82 may be used to position an on-screen cursor, indicator, or highlight (sometimes all generically referred to herein as a highlight or highlight region) to indicate interest in a particular option or other item on a screen displayed by the interactive television application.

An OK key 84 (or in other embodiments a select or enter key) may be used to select on-screen options that the user has highlighted.

Keys 74 may include a record key 86 for initiating recordings. Menu button 88 may be used to direct the interactive television application to display a menu on the user's display screen (e.g., on television 64 or 68 or on a suitable monitor or computer display). Info button 90 may be used to direct the interactive television application to display an information display screen. If the user has highlighted a particular program listing, for example, selecting the info button 90 may direct the interactive television application to provide additional program schedule information related to that program listing (e.g., a program summary, actor information, etc.).

Lock button 92 may be used to modify access privileges. For example, a parent may use lock button 92 or on-screen options to establish parental control settings for the interactive television application. The parental control settings may be time-based settings (e.g., to prevent a child from watching television during a particular time block such as from 3:00 PM to 5:00 PM). The parental control settings may also be used to block programming based on rating, channel, program title, etc. A locked or blocked program is typically not viewable until the interactive television application is provided with a suitable personal identification number (PIN). Once this PIN has been entered, the interactive television program will unlock the user's equipment and allow the locked content to be accessed.

Exit button 94 may be used to exit the interactive television application or to exit a portion of the interactive television application. Guide button 96 may be used to invoke the interactive television application.

The keys shown in FIG. 3 are merely illustrative. Other keys or buttons may be provided if desired. For example, a music button may be used to access music with the interactive television application. An edit button may be used to edit stored content (e.g., to remove commercials, remove portions of a video, etc.). Alphanumeric buttons may be used to enter alphanumeric characters. A last or back button may be used to browse backward in the interactive television application (e.g., to return to a previous channel or display screen). A help key may be used to invoke help functions such as context-sensitive on-screen help, etc.

Figure 4:
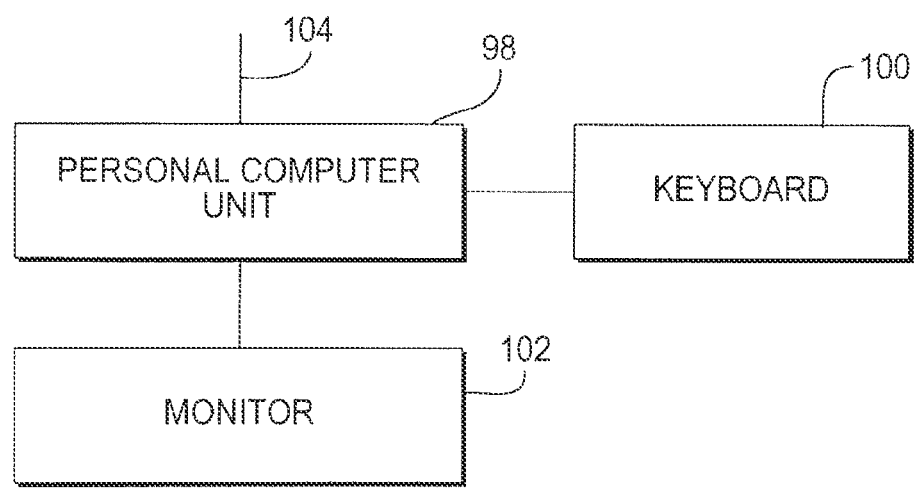
FIG. 4 is a diagram of illustrative computer equipment in accordance with the present invention.

Illustrative user computer equipment 22 is shown in FIG. 4. In the arrangement of FIG. 4, personal computer 98 may be controlled by the user using keyboard 100 or other suitable user input device, such as a trackball, mouse, touch pad, touch screen, voice recognition system, a remote control such as remote control 72 of FIG. 3, etc. Video content such as television programming and interactive television application display screens may be displayed on monitor 102. Television programming, video-on-demand content, video recordings played back from a network-based video recorder, and other information may be received from paths 28 and 48 (FIG. 1) using input/output 104. The user may also send commands and other information used during interactions with the interactive television application and system 10 over input/output line 104.

Personal computer unit 98 may contain a television or video card such as television tuner card for decoding analog and digital television channels and for handling streaming video content. Multiple video cards (e.g., tuner cards) may be provided if desired. An illustrative television tuner card that may be used may contain an analog television tuner for tuning to a given analog channel and digital decoding circuitry for filtering out a desired digital television or music channel from a packetized digital data stream. Any suitable card or components in computer unit 98 may be used to handle video and other content delivered via input/output line 104 if desired.

Personal computer unit 98 may contain one or more processors (e.g., microprocessors) that are used to run the interactive television application or a portion of the interactive television application.

Video recording functions may be provided by the interactive television application in a personal video recorder arrangement or a network-based video recorder arrangement, or any other suitable arrangement.

In a personal video recorder arrangement, storage in personal computer unit 98 may be a hard drive, DVD-R drive, DVD-RW drive, CD-R drive, CR-RW drive, or other suitable storage device or devices for storing video and other content. The interactive television application and personal computer unit 98 may use this storage to provide the functions of a personal video recorder.

Network-based video recording functions may be provided using a combination of user equipment 18 and network equipment. User equipment 18 may be, for example, user television equipment 20 or user computer equipment 22. Network equipment may be, for example, server 56, server 36, or equipment at service providers such as service provider 50 of FIG. 1. Video recording functions may be provided by storing copies of television programs and other video content on a remote server (e.g., server 56 or server 36 of FIG. 1) or other network-based equipment such as equipment at a service provider such as service provider 50.

Video recordings may be made in response to user commands that are entered at user equipment 18. In a personal video recorder arrangement, the interactive television application may be used to record video locally on the user equipment in response to the user commands. In a network-based video recorder arrangement, the interactive television application may be used to record video or to make virtual recordings on network equipment such as server 36, 56, or equipment at service provider 50 in response to the user commands. The user commands may be provided to the network equipment over the communications paths shown in FIG. 1. The personal video recorder arrangement and the network-based video recorder arrangement can support functions such as fast-forward, rewind, pause, play, and record.

To avoid unnecessary duplication in a network-based video recorder environment, the system 10 may provide network-based video recording capabilities by using virtual copies or recordings. With this approach, each user may be provided with a personal area on the network that contains a list of that user's recordings. The video content need only be stored once (or a relatively small number of times) on the network equipment, even though a large number of users may have that video content listed as one of their recordings in their network-based video recorder personal area.

The user television equipment and user computer equipment arrangements described above are merely illustrative. A more generalized embodiment of illustrative user equipment is shown in FIG. 5.

Figure 5:
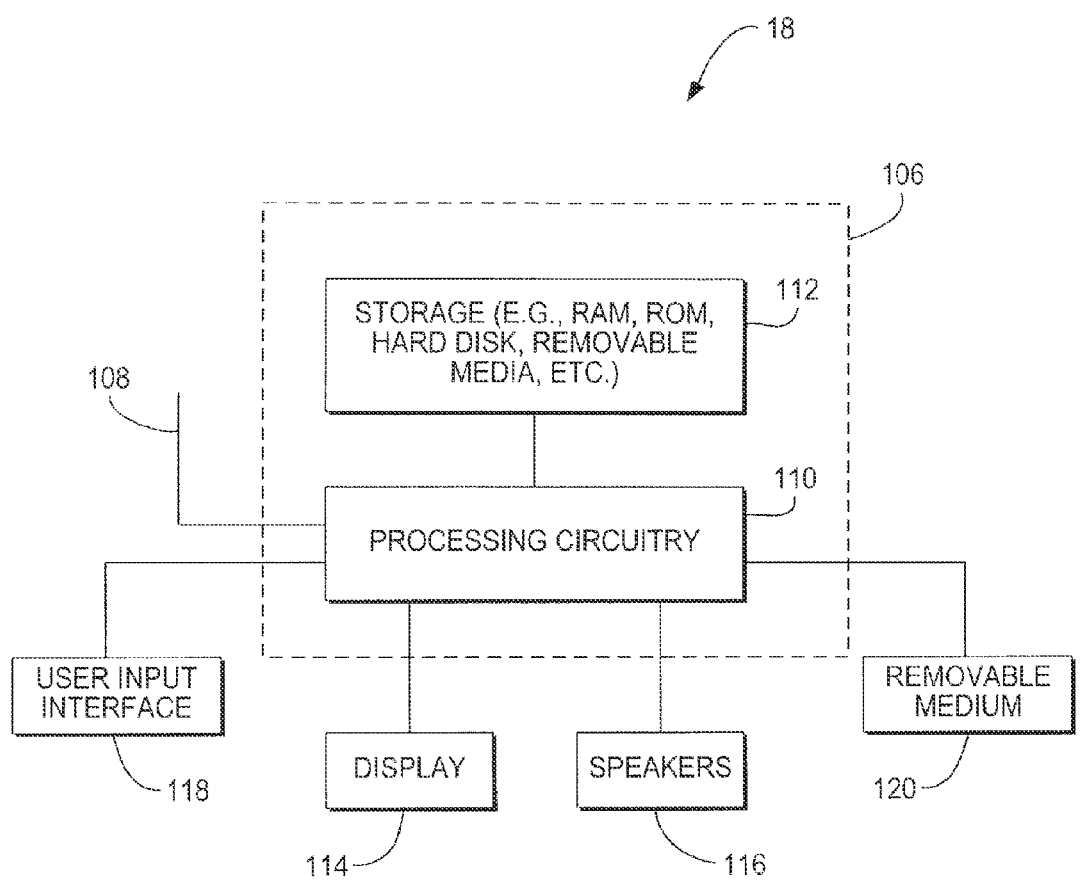
FIG. 5 is a diagram of illustrative user equipment in accordance with the present invention.

As shown in FIG. 5, control circuitry 106 is connected to input/output 108. Input/output 108 may be connected to one or more communications paths such as paths 26, 27, 28, 42, 46, and 48 of FIG. 1. Television and music programming may be received via input/output 108 (e.g., from programming sources 12, servers or other equipment such as server 36, service providers such as service provider 50, and television distribution facility 14). Program schedule information for an interactive television application may be received from data source 30 via input/output 108. Input/output 108 may also be used to receive information transmitted by data source 30 for other interactive television applications. The user may use control circuitry 106 to send commands, requests, and other suitable information using input/output 108.

Control circuitry 106 may be based on any suitable processing circuitry 110 such as processing circuitry based on one or more microprocessors, microcontrollers, digital signal processors, programmable logic devices, etc. Memory (e.g., random-access memory and read-only memory), hard drives, DVD drives, CD drives, or any other suitable memory or storage devices may be provided as storage 112 that is part of control circuitry 106. Tuning circuitry such as one or more analog tuners, one or more MPEG-2 decoders or other digital video circuitry, or any other suitable tuning or video circuits or combinations of such circuits may also be included as part of circuitry 106. Encoding circuitry (e.g., for converting over-the-air or cable analog signals to MPEG signals for storage) may also be provided. The tuning and encoding circuitry may be used by the user equipment to receive and display or play or record a particular television or music channel or other desired audio and video content (e.g., video-on-demand content or requested network-based or local video recorder playback). Television programming and other video and on-screen options and information may be displayed on display 114. Display 114 may be a monitor, a television, or any other suitable equipment for displaying visual images. Speakers 116 may be provided as part of a television or may be stand-alone units. Digital music and the audio component of videos displayed on display 114 may be played through speakers 116.

A user may control the control circuitry 106 using user input interface 118. The user input interface 118 may be any suitable user interface, such as a mouse, trackball, keypad, keyboard, touch screen, touch pad, voice recognition interface, remote control, etc.

As discussed previously, additional storage may be provided one or more removable media (e.g., removable medium 120). Processing circuitry 110 may include circuitry for reading from and writing to removable medium 120. Processing circuitry may also include circuitry for performing wireless communication with removable medium 120.

The interactive television application may allow the user to record a program using a recording device, such as a video cassette recorder, digital video recorder, or other device or devices with storage capabilities. The interactive television application may also allow the user to record a program on a remote server that is accessible by the interactive television application. The ability to record programs using an interactive television application is discussed in greater detail in Ellis et al. U.S. Pat. No. 6,141,488 and Ellis et al.

U.S. patent application Ser. No. 09/332,244, filed on Jun. 11, 1999, which are hereby incorporated by reference herein in their entireties.

The interactive television application may also allow the user to extract audio information from the recorded program. The extracted audio information may be transmitted from the recording device to a removable medium (e.g., a compact flash card).

It should be noted that the interactive television application may restrict the extraction of audio to enforce digital rights management (DRM) rights or as a security measure. For example, data may be embedded within a recorded program, such as, for example, a pay-per-view program to prevent the interactive television application from extracting audio from the pay-per-view program. In another example, a broadcast flag may be transmitted along with a currently broadcast program, which may indicate the restrictions on accessing or distributing the program after it has been recorded. For example, the restriction may include a restriction on the user's ability to extract audio from the program. In another example, the restriction may include a limitation on the number of times audio may be extracted from the program. In another example, the restriction may include a restriction of the format and quality of the extracted audio.

Figure 6:
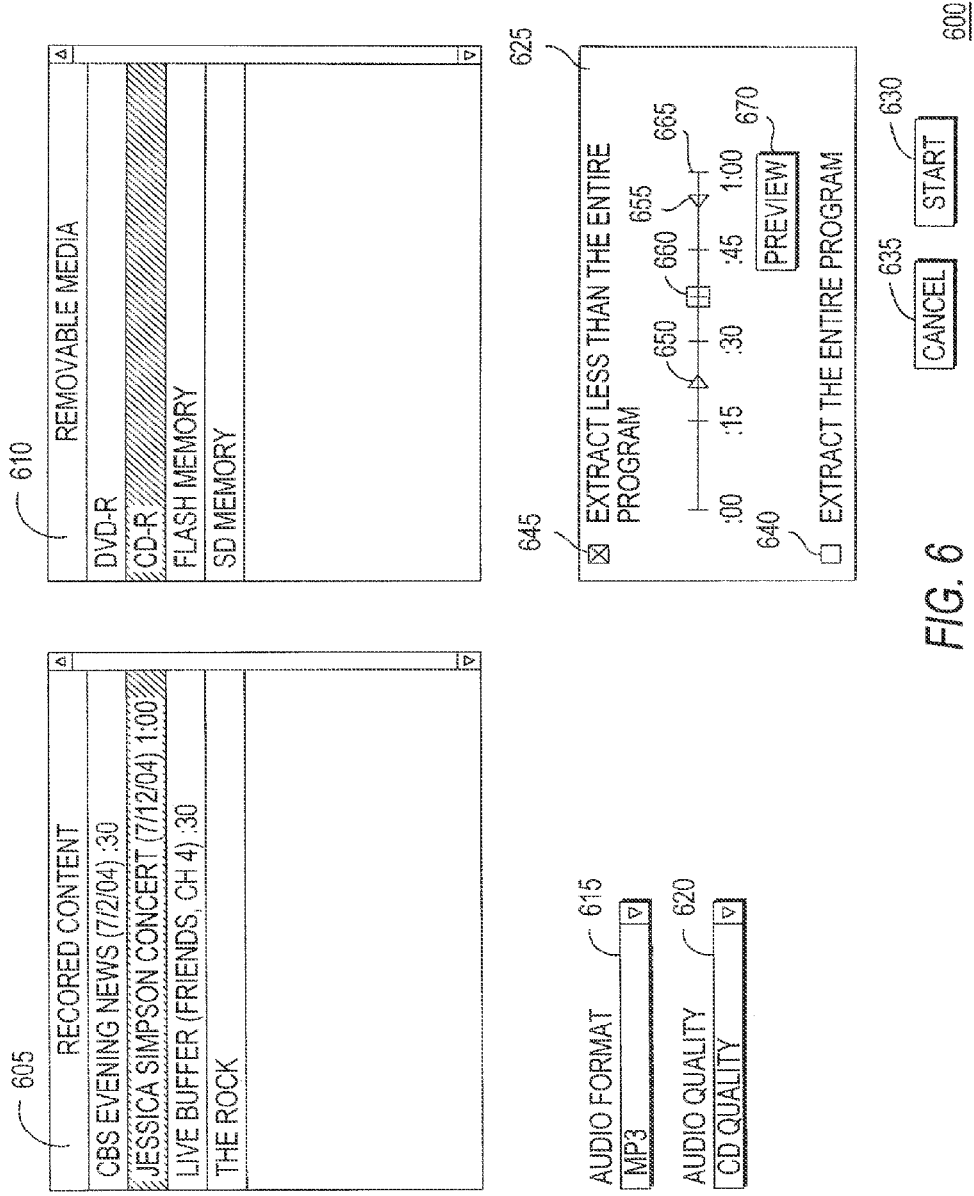
FIG. 6 is an illustrative screen for extracting audio from a recorded program in accordance with the present invention.

FIG. 6 is an illustrative screen for extracting audio from a recorded program in accordance with the present invention. Screen 600 may include, for example, a program listing 605, a target listing 610, a format drop-down menu 615, a quality drop-down menu 620, a segment selection area 625, a start button 630, and a cancel button 635. Screen 600 uses common graphical user interface objects, such as, for example, lists, drop-down menus, check boxes and buttons. However, it should be noted that these objects are merely illustrative and equivalent objects may be used by those skilled in the art without departing from the scope of the invention. For example, program listing 605 may be replaced by a drop-down menu having each listing as one of its options.

Program listing 605 may include a listing of recorded programs stored on set-top box 60 or recorded content accessible from set-top box 60 (e.g., a remote server). As shown in FIG. 6, the user has recorded several programs (e.g., the CBS Evening News, a Jessica Simpson concert, and the movie, "The Rock"). These programs may be stored locally on set-top box 60, or they may be stored on a remote server that is accessible by set-top box 60.

The interactive television application may allow the user to select a live buffer from program listings area 605. The interactive television application may provide the live buffer to record programs currently being viewed by the user, such that the user may perform real-time transport functions on the live buffer (e.g., rewind, pause, fast-forward, etc.). By allowing the user to select the content stored on the live buffer, the user may, for example, be able to extract all of the audio from a program after having already viewed a portion of the program.

The interactive television application may allow the user to select a current recording from program listings area 605. A current recording is similar to a program stored in the live buffer in that both have not been completely recorded by the interaction television application.

Removable media listing 610 may include a listing of removable media to which the extracted audio may be transferred. The interactive television application may allow the user to navigate a highlight region to select a removable medium. In some embodiments, the interactive television application may automatically detect the available removable media. For example, if set-top box 60 includes or is connected to a DVD recording device, removable media listing 610 may include an option to select a DVD-R as the removable medium. For purposes of illustration and not limitation, it will be assumed that removable medium 62 is the removable medium selected by the user.

Format drop-down menu 615 may include a listing of audio formats into which the extracted audio may be converted. The user may select an audio format that is compatible with a music player on which the audio is to be played (e.g., selecting the MP3 format for use with an MP3 player). Audio formats may include, for example, MP3, uncompressed wave (WAV), Windows Media Audio™ (WMA), and any other suitable audio format. To reduce the risk of exceeding the capacity of the selected removable medium, the user may wish to select compressed formats (e.g., MP3, WMA) if removable medium 62 is a small capacity medium (e.g., solid-state memory). Uncompressed formats (e.g., WAV) may be more suitable if removable medium 62 is a large capacity medium such as, for example, a CD-R.

Quality drop-down menu 620 may include a listing of quality options for the extracted audio. Basic quality options may include, for example, CD quality, stereo quality, mono, and any other suitable quality option. More advanced quality options may include, for example, a range of sampling rates at which to resample the extracted audio and options specific to the selected audio format (e.g., the number of channels for WAV format).

The user may select an audio quality setting based on the nature of the program selected in program listings area 605. For example, if the selected program is news commentary, then a high quality setting is not necessary. However, if the selected program is a musical performance, then the user may wish select the highest quality setting available. The highest quality available may be limited by, for example, the available capacity on removable medium 62. The user may also select a quality setting based on the capacity of removable medium 62. For example, if removable medium 62 has a small capacity, the user may wish to select a lower quality for audio content stored on removable medium 62.

Segment selection area 625 may include options for allowing the user to extract audio from a segment of the program. For example, if the selected program is a two-hour concert, the interactive television application may allow the user to extract the audio for individual songs. In another example, if selected program is a football game, then for space considerations, the interactive television application may allow the user to extract the audio for the first and second halves of the game, thereby not extracting the half hour of the program devoted to half-time.

As shown in FIG. 6, the interactive television application may allow the user to select the entire program for extraction (e.g., by selecting checkbox 640) or a portion of the program for extraction (e.g., by selecting checkbox 645). The interactive television application may display a progress bar 665 to assist the user in selecting the portions of the program from which to extract audio. The interactive television application may allow the user to select a start time with start marker 650 and an end time with end marker 655 (which, by default, may be displayed at the start and end of the program, respectively). The interactive television application may allow the user to select and move start marker 650 and end marker 655 using, for example, remote control 72.

In some embodiments, the interactive television application may allow the user to select multiple start and end times. For example, the interactive television application may allow the user to place a cursor 660 at a point along progress bar 665. The interactive television application may also allow the user to move cursor 660 along progress bar 665. The user may select, for example, OK button 84 on remote control 72 to add an additional marker at the position of cursor 660 on progress bar 665. The interactive television application may determine whether the additional marker is a start or end marker by examining the markers to the left and right of cursor 660. For example, if the marker to the left of cursor 660 is an end marker, the interactive television application may determine that the additional marker is a start marker.

The interactive television application may also allow the user to remove start and end markers that were previously added. For example, the user may select a start or end marker using remote control 72. In response to the user selecting, for example, a delete button on remote control 72, the interactive television application may remove the selected marker.

The interactive television application may also allow the user to preview the audio of the program to assist the user in selecting start and end times. For example, in response to the user selecting preview button 670, the interactive television application may play the audio of the program at the position of marker 660. Marker 660 may track the progress of the audio as it plays. The interactive television application may also allow the user to reposition marker 660 using, for example, cursor keys 82 on remote control 72.

In some embodiments, in lieu of marker 660, audio may be previewed from the location of a start or end marker whenever the user repositions the start or end marker. For example, the user may wish to position the start marker at the beginning of a particular song. The interactive television application may play the audio at the location of the start marker while it is being moved to allow the user to pinpoint the beginning of the song.

In some embodiments, if the user selects an incomplete recording (e.g., a currently recorded program or a program stored on the live buffer) from program listing 605, portions of the program which have yet to be recorded may appear on progress bar 665 in a shade of grey to indicate that it is not yet available. For example, if "Friends" is stored in the live buffer and there is still ten minutes left of "Friends," the interactive television application may display the last ten minutes of the live buffer on progress bar 665 in grey.

In some embodiments, if the user has selected a currently recorded program (e.g., from the live buffer or a previously scheduled recording), the interactive television application may wait until the recording is complete before extracting audio from the recording. In some embodiments, if the user has selected a portion of a currently recorded program that has already been recorded, the interactive television application may extract the audio from the portion of the recording before the entire recording is complete.

In response to the user selecting start button 630, the interactive television application may begin extracting audio from the recorded program. In some embodiments, if the user selected to extract audio from multiple segments of the program, the interactive television application may split the program into the selected segments. The interactive television application may de-multiplex each segment of the recorded program, such that the audio and video components of the recorded programs are stored in separate files.

In some embodiments, the interactive television application may de-multiplex the entire recorded program. If the user selected to extract audio from segments of the program, the interactive television application may splice the selected segments from the audio file.

In some embodiments, if the user selected to extract audio from multiple segments of the program, the interactive television application may join together the resulting audio files in the order they occur in the recorded program. For example, if the user selected to extract the audio for the first and second halves of a football game (i.e., extracting audio from all but the half-time report), the user may prefer that the two audio files be joined together to form a single audio file. In some embodiments, the audio files may be left separate. For example, if the user selected segments from a concert (e.g., songs), the user may prefer that each song be stored in a separate audio file.

The method used by the interactive television application to de-multiplex the recorded program depends on the format in which the recorded program is stored. For example, an MPEG file compresses audio and video information on separate layers. De-multiplexing an MPEG file involves separating the audio and video layers of information. For example, the interactive television application may parse the MPEG file to separate the data packets corresponding to video and audio information into separate files.

In some embodiments, if the recorded program is stored on a remote server, the interactive television application may send a request to the remote server to de-multiplex the recorded program. The remote server may send an audio file corresponding to the audio of the recorded program to set-top box 60. This approach decreases the amount of information transferred by the remote server to set-top box 60.

In some embodiments, if the recorded program is stored on a remote server, the interactive television application may send a request to the remote server to transfer the recorded program to set-top box 60. The interactive television application may de-multiplex the recorded program locally. This approach decreases the amount of processing required by the remote server.

After the recorded program has been de-multiplexed, the interactive television application may process the resulting audio files in accordance with the settings selected by the user. For example, the user may specify that the audio should be a CD-quality MP3 file. The interactive television application may convert the resulting audio file into a MP3 file with a CD-quality sampling rate (e.g., 128 kbps).

In some embodiments, the interactive television application may supplement the converted audio file with program information. For example, MP3 and WMA formats support displaying program information (e.g., artist and title) on a music player corresponding to the audio being played by the music player. Program information may be derived from program guide information, program listings, or metadata embedded in the stream of the program. In some embodiments, the program information may have been entered by the user for the recorded program.

The interactive television application may determine the total size of the converted audio file and compare the size of the file to the available capacity of removable medium 62. In some embodiments, the interactive television application may overlay a dialog box over screen 600 indicating to the user the size of the converted audio file and the amount of space available on removable medium 62. The interactive television application may also request that the user confirm that the transfer of the converted audio file to removable medium 62.

If the interactive television application determines that removable medium 62 does not have sufficient capacity to store the converted audio file, the interactive television application may provide the user with an option to select digital content stored on removable medium 62 to overwrite (if possible) or it may prompt the user to insert another medium. In some embodiments, the interactive television application may automatically overwrite the oldest audio file or the shortest audio file stored on removable medium 62 necessary to free the capacity to store the converted audio file.

If the interactive television application determines that there is sufficient capacity on removable medium 62 to store the converted audio file, the interactive television application may transfer the converted audio file to removable medium 62.

The screen shown in FIG. 6 for selecting settings for audio extraction is merely illustrative. Those skilled in the art should recognize that the user may select settings for audio extraction using a different approach without departing from the scope of the present invention. For example, in lieu of screen 600, the interactive television application may display a series of overlays with which the user may select options for extracting audio. The user may select a program from, for example, program listings or a play list. The interactive television application may display an overlay for allowing the user to select a removable medium (e.g., removable medium 62). In response to the user selecting removable medium 62, the interactive television application may display another overlay having audio format and quality options. In response to the user selecting format and quality options, the interactive television application may display another overlay having segment selection options. Once all of the settings have been selected by the user, the interactive television application may extract the audio from the program (e.g., de-multiplex the program) and process the audio using the selected settings. The interactive television application may transfer the processed audio to removable medium 62.

Figure 7A:
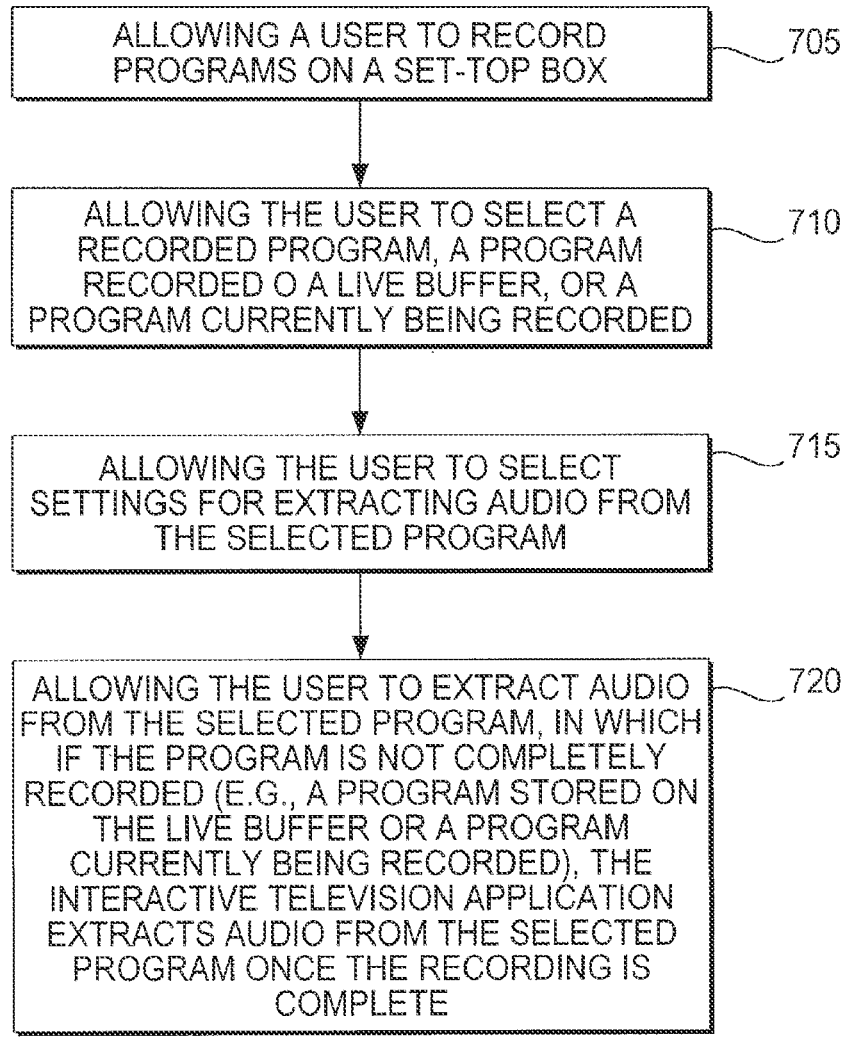
FIG. 7A is an illustrative flow diagram for extracting audio from a recorded program in accordance with the present invention.

FIG. 7A is an illustrative flow diagram for extracting audio from a recorded program in accordance with the present invention.

At step 705, the interactive television application may allow a user to record programs using the interactive television application. The programs may be recorded on, for example, set-top box 60, a digital video recorder, a remote server, a DVD recorder, or any other suitable storage device.

At step 710, the interactive television application may allow the user to select a source from which audio may be extracted. Sources may include, for example, recorded programs, a program currently being recorded, or a program recorded on a live buffer.

Figure 7B:
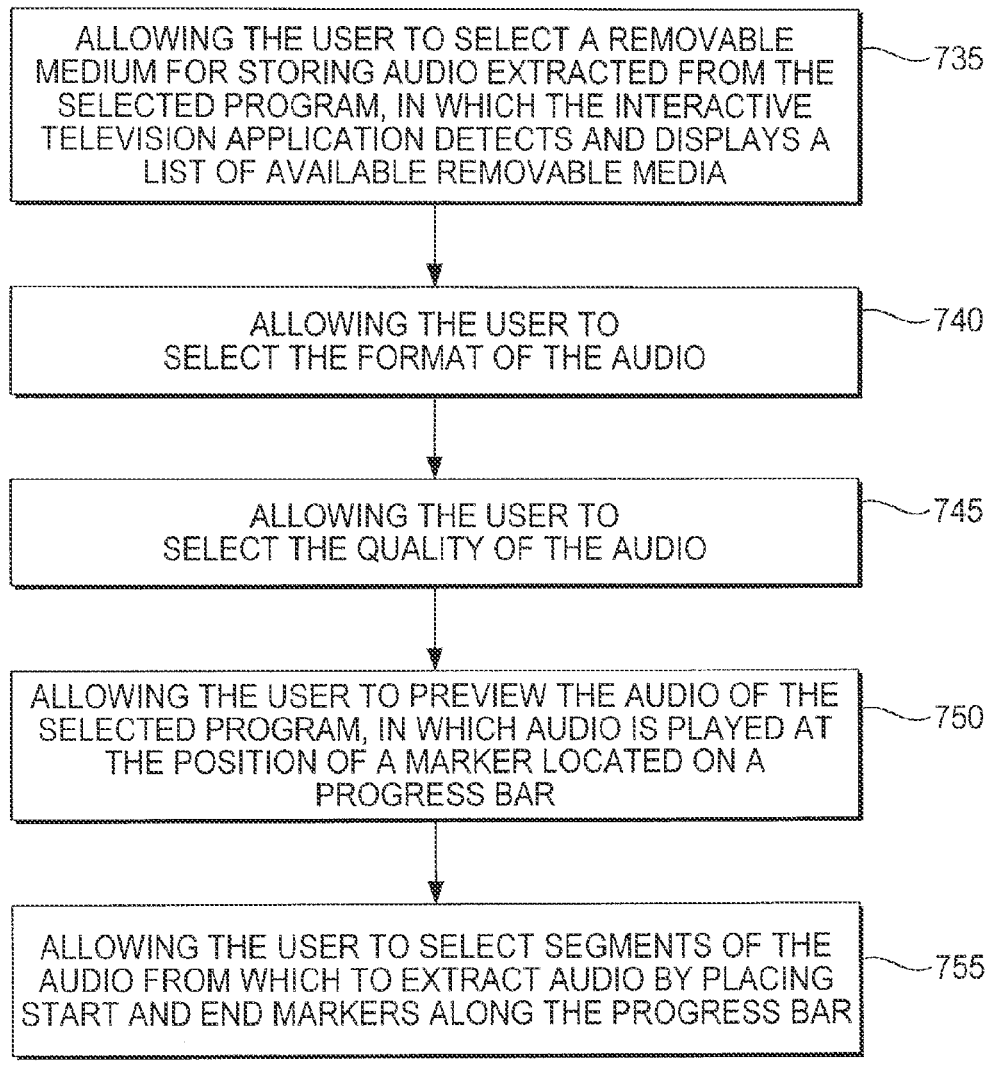
FIG. 7B is an illustrative flow diagram for determining the settings for extracting audio from a recorded program in accordance with the present invention.

At step 715, the interactive television application may allow the user to select settings for extracting audio from the selected program. Step 715 is shown in more detail in FIG. 7B.

At step 735 (FIG. 7B), the interactive television application may detect available removable media and display a list of the available removable media. The user may select a removable medium to which audio extracted from the selected program may be transferred (e.g., removable medium 62).

At steps 740 and 745 (FIG. 7B), the interactive television application may allow the user to select a format and quality for the extracted audio.

At steps 750 and 755 (FIG. 7B), the interactive television application may allow the user to select segments of the recorded program for extracting audio. The interactive television application may display a progress bar and start and end markers. The interactive television application may allow the user to position the start and end markers on the progress bar to indicate a segment of the program from which to extract audio. The interactive television application may also allow the user to preview the audio of the recorded program. For example, the interactive television application may display a marker on the progress bar to indicate the location in the program at which audio is being played.

Figure 7C:
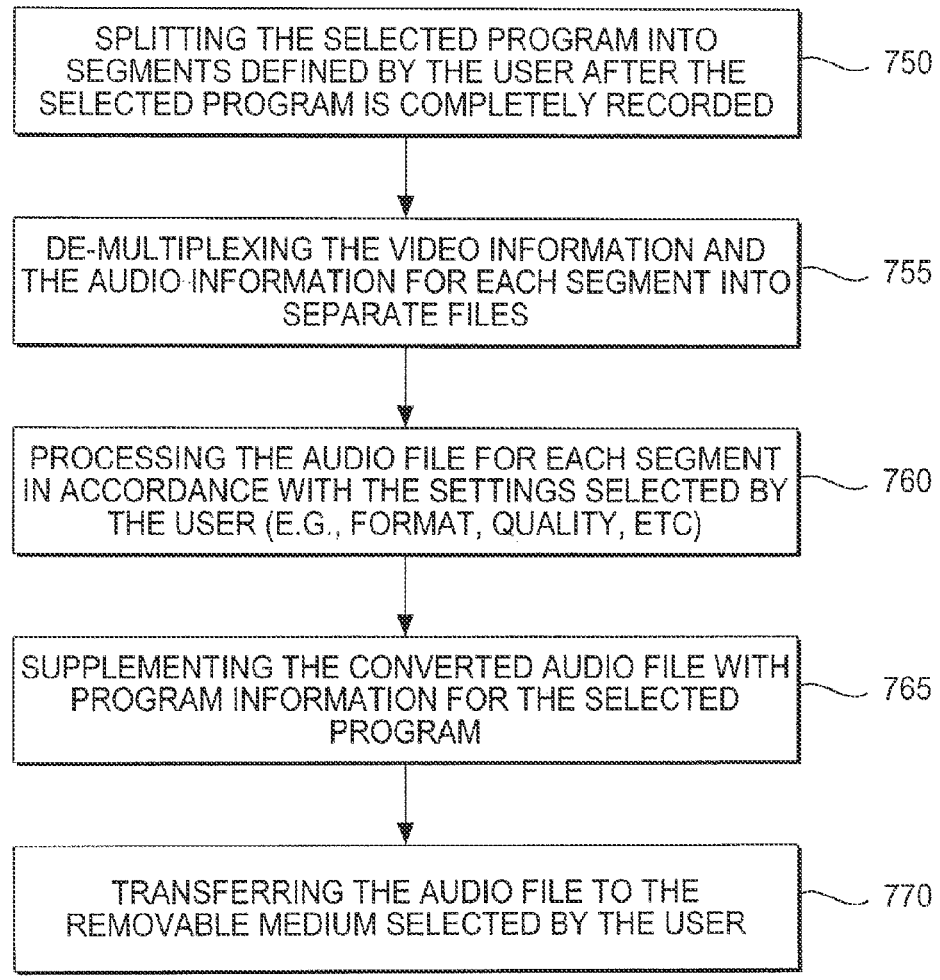
FIG. 7C is an illustrative flow diagram for extracting audio from a recorded program in accordance with the present invention.

At step 720, the interactive television application may allow the user to extract audio from the selected program. If the selected program is a recording that is not yet complete, the interactive television application may wait until the recording is complete before performing audio extraction. Step 720 is shown in more detail in FIG. 7C.

At step 750 (FIG. 7C), the interactive television application may split the recorded program into segments defined by the user. If the user selects to extract audio from the entire program, the interactive television application may consider the entire program one segment.

At step 755 (FIG. 7C), the interactive television application may de-multiplex the segments of the selected program into separate audio and video files. In some embodiments, instead of splitting the selected program into segments, the interactive television application may de-multiplex the selected program before splitting the resulting audio file into segments.

At step 760 (FIG. 7C), the interactive television application may process the resulting audio file in accordance with the settings selected by the user. For example, the interactive television application may convert the resulting audio file to MP3 format. The interactive television application may also resample the MP3 file in accordance with the user's quality setting.

At step 765 (FIG. 7C), the interactive television application may supplement the converted audio file with program information. The program information may be derived from, for example, program listings, program guide information, or metadata embedded in the stream of the program. In some embodiments, the program information may have been entered by the user for the recorded program. The program information may be displayed by, for example, a music player, while playing the converted audio file.

At step 770 (FIG. 7C), the interactive television application may transfer the exported audio to removable medium 62. Prior to transfer, the interactive television application may verify that removable medium 62 contains sufficient capacity to store the exported audio.

In addition to extracting audio from recorded programs, the interactive television application may also record audio from programs that have yet to be broadcast. In this approach, the user is not required to a record program before extracting audio from the program.

Figure 8:
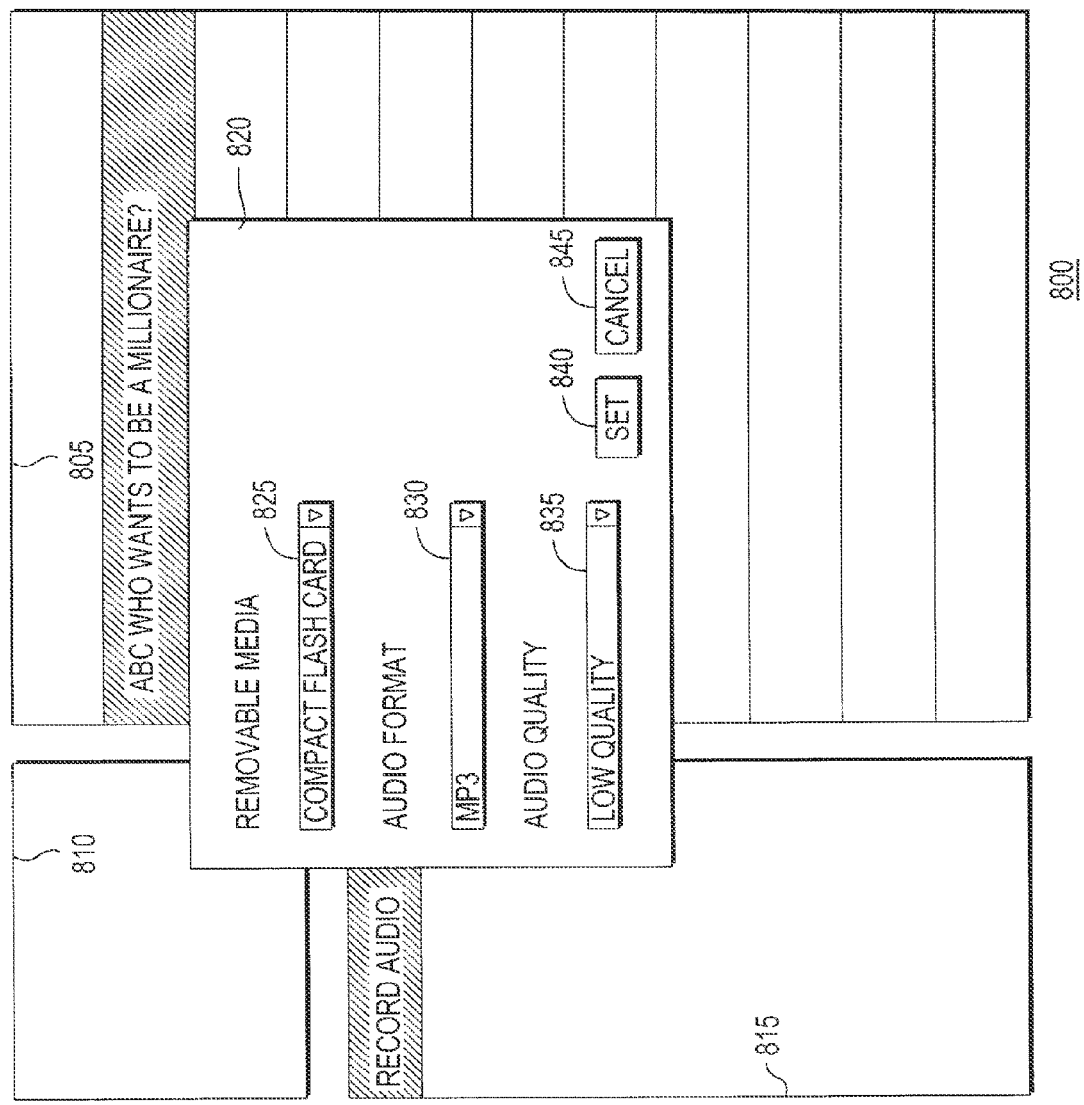
FIG. 8 is an illustrative screen for scheduling a recording of audio from a program on removable media in accordance with the present invention.

FIG. 8 is an illustrative screen for scheduling recordings of audio information on removable media (e.g., removable medium 62). As shown, screen 800 is a program listings screen, which includes a program listings area 805, a preview window 810, an options area 815, and an audio recording overlay 820. Program listings screens are discussed in greater detail in Ellis et al. U.S. Patent Publication No. 20040103434, which is hereby incorporated by reference herein in its entirety.

Program listings area 805 may include a listing of programs that are scheduled to be broadcast during a certain time slot. The user may navigate a highlight region to select a program listing in program listings area 805 using, for example, cursor keys 82 on remote control 72. In response to the user selecting a program listing, the interactive television application may allow the user to select options for the program from options area 815. In response to the user selecting the option to record audio on removable media, the interactive television application may display audio recording overlay 820 on screen 800. Audio recording overlay 820 may also be invoked from, for example, a program information screen by pressing a button on remote control 72.

Audio recording overlay 820 may include a removable media selection drop-down menu 825, a format drop-down menu 830, a quality drop-down menu 835, a set button 840, and a cancel button 845.

The user may use removable media selection drop-down menu 825 to select available removable media to which the recorded audio for the selected program may be transferred. The interactive television application may detect available removable media and display entries for the available removable media in drop-down menu 825.

The interactive television application may allow the user to select an audio format from format drop-down menu 830. Formats may include, for example, MP3, uncompressed wave (WAV), Windows Media Audio (WMA), and any other suitable audio format.

The interactive television application may allow the user to select a quality setting from quality drop-down menu 835. Quality settings may include, for example, low quality, medium quality, high quality, mono, stereo, CD-quality, and any other suitable quality setting. Quality settings may also include a range of sampling rates (e.g., 128 kbps).

In response to the user selecting save button 840, the interactive television application may schedule a recording of the audio of the selected program when the program is broadcast. In some embodiments, the audio may be recorded directly on the selected removable medium. In some embodiments, the interactive television application may record the audio on set-top box 60 or a remote server and transfer the recorded audio to the selected removable medium (e.g., removable medium 62) when the recording is complete. In response to the user selecting cancel button 845, the interactive television application may remove audio recording overlay 820 from screen 800.

In another aspect of the invention, the user may configure the interactive television application to perform automatic future transfers of digital content to removable media, such that the future transfers occur without requiring further user interaction. For example, the user may configure the interactive television application to transfer the most recent recording of a news program to a Compact Flash (CF) card whenever it is inserted into set-top box 60. The user may, for example, insert the Compact Flash card into set-top box 60 every morning to retrieve the news program for that day and view the news program on a handheld device (e.g., a handheld computer, a laptop, a cellular phone, an automobile computer) while riding the train to work. Because the transfer has already been set up, the user is not burdened with the task of repeatedly setting up the transfer every morning.

It should be noted that the interactive television application may restrict the transfer of digital content to removable media to enforce digital rights management (DRM) rights or as a security measure. For example, data may be embedded within digital content, such as, for example, a pay-per-view program to prevent the interactive television application from copying the pay-per-view program. In another example, digital content that has been recorded from an over-the-air broadcast may include a broadcast flag, which may indicate the restrictions on accessing or distributing the digital content. For example, the restriction may include a restriction on the user's ability to transfer the digital content. In another example, the restriction may include a limitation on the number of times the digital content may be transferred. In another example, the restriction may include a restriction of types of removable media to which the digital content may be transferred. In another example, the restriction may include a restriction on the settings for converting (e.g., transcoding) the digital content.

Figure 9:
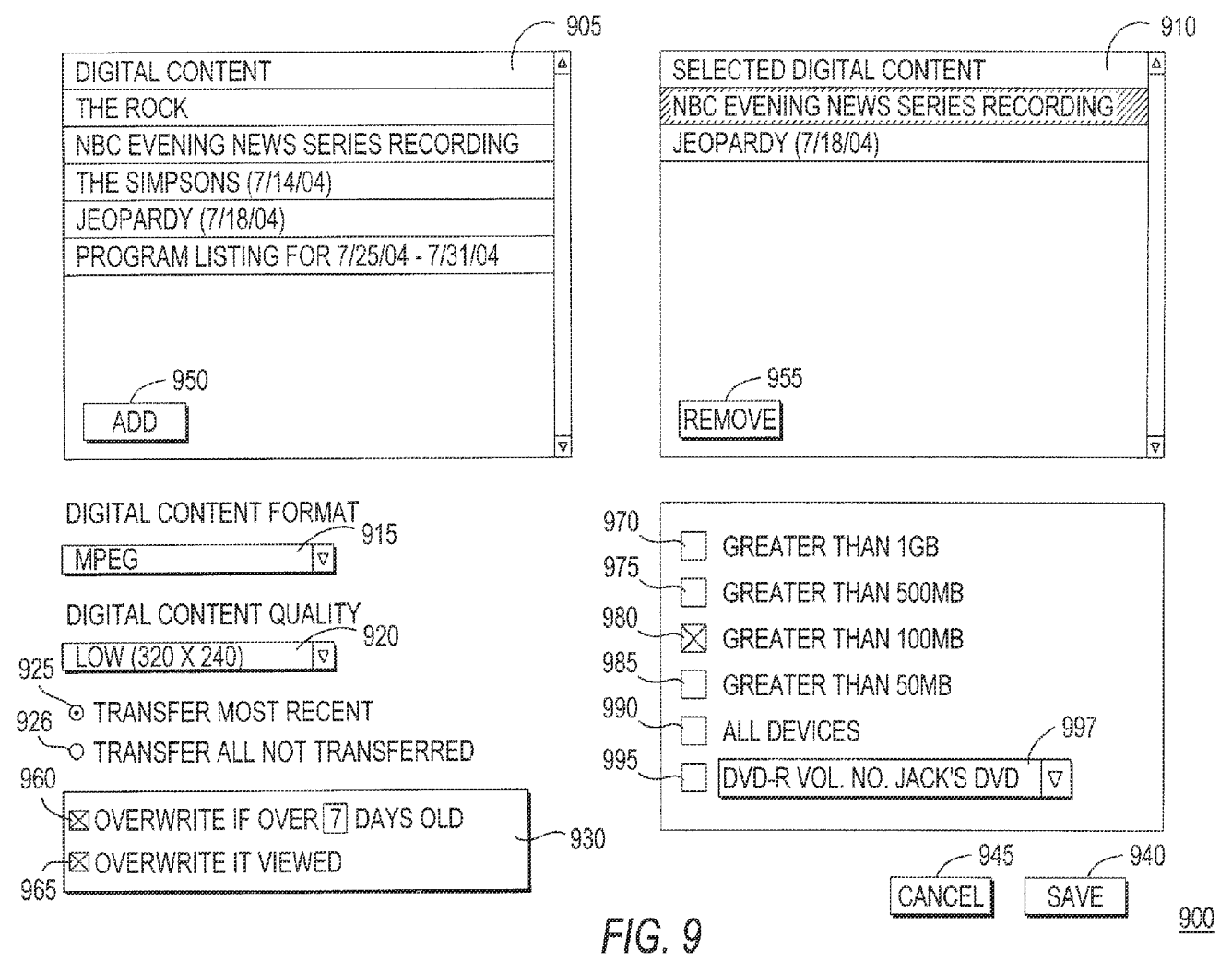

FIG. 9 is an illustrative screen for configuring the interactive television application to perform future transfers of digital content to removable media in accordance with the present invention.

Screen 900 may include, for example, a digital content selection area 905, a digital content listing area 910, a format drop-down menu 915, a quality drop-down menu 920, recurring digital content settings radio buttons 925 and 926, an update settings area 930, a removable media selection area 935, a save button 940, and a cancel button 945.

Screen 900 uses common graphical user interface objects, such as, for example, lists, drop-down menus, check boxes and buttons. However, it should be noted that these objects are merely illustrative and equivalent objects may be used by those skilled in the art without departing from the scope of the invention. For example, checkbox 960 may be replaced by a radio button.

Digital content selection area 905 may include a listing of digital content stored on or accessible by set-top box 60. Digital content selection area 905 may also include an add button 950. Digital content may include for example, recorded programs, recorded audio, program listings and information, and any other suitable digital content. The interactive television application may also list series recordings in digital content selection area 905. The user may navigate a highlight region to select one of the digital content listings, using for example, remote control 72. In response to the user selecting add button 950, the interactive television application may add a listing for the selected digital content to digital content listing area 910.

Digital content listing area 910 may include a listing of digital content selected to be transferred to removable media. Digital content listing area 910 may also include a remove button 955. The user may navigate a highlight region in area 910 to select one of the digital content listings displayed in area 910. In response to the user selecting remove button 955, the selected digital content listing may be removed from area 910. The position of the highlight region may also determine the digital content listing to which settings are applied. The interactive television application may apply different settings to each digital content listing.

Format drop-down menu 915 may include a listing of formats into which the selected digital content may be converted before being transferred to removable media. As shown in FIG. 9, the user has selected to save a series recording of "NBC Nightly News" in MPEG format.

In addition to MPEG format, other video formats may include, for example, MPEG, AVI, MOV, RM, DIVX, and any other suitable format. Audio formats may include, for example, MP3, WAV, WMA and any other suitable format. Image formats may include, for example, JPG, GIF, BMP, TIFF, and any other suitable format. Text formats may include, for example, TXT, PDF, HTM, and any other suitable format.

The interactive television application may allow the user to convert digital content from one format to another format of the same media type (e.g., video, audio, etc.). The user may select a format to conserve storage space (i.e., the user may select a format with a high level of compression). The user may select a format that is compatible with a device used for accessing the digital content. For example, the user may convert a video to MPEG format in order to view the video on a handheld video player that only plays MPEG files.

In some embodiments, the interactive television application may allow the user to convert digital content from a format of one media type to a format of another media type. For example, if the selected digital content is video, the interactive television application may allow the user to save the digital content in an audio format. This may be desirable, for example, if the nature of the digital content is such that the audio portion is of more interest to the user (e.g., a recording of a talk show or commentary). If the user selects an audio format for a video, the interactive television application may de-multiplex the video before transferring the resulting audio file to removable media.

In some embodiments, if the user selects, for example, program listings as the selected digital content, the interactive television application may allow the user to save the program listings in a text format, such as, for example, a PDF file. The user may be able to browse the program listings while away from the interactive television application.

Quality drop-down menu 920 may include a listing of quality settings for the format selected in format drop-down menu 915. As shown in FIG. 9, the user has instructed the interactive television application to transfer the recording of "NBC Nightly News" to the removable medium at a low resolution.

In addition to a low resolution setting, quality settings for video formats may include medium resolution and high resolution. Quality settings for video formats may also include a range of resolutions from the lowest resolution (e.g., 320×240) up to the native resolution of the video. In another example, if the selected format is MP3, the quality settings may include a range of sampling rates.

In some embodiments, if the digital content is a video, the user may wish to select a resolution suited for a device on which the video is to be played. For example, it would not be practical to store a high definition video (e.g., having a 1920×1080 resolution) on a compact flash card if the user intends to view the video on a cellular phone with a native resolution of 120×90. Accordingly, the user may select a quality setting to scale the resolution of the video down to the native resolution of the device on which the video is to be played. Scaling down the resolution of the video not only maximizes the quality of the video (i.e., because the video is displayed at the maximum resolution of the device), but also reduces the amount of space required to store the video on removable media.

In some embodiments, the quality settings may also include a maximum quality setting. For example, the user may select an audio file to be transferred to a removable medium that contains existing digital content. The user may wish to listen to the audio file on a high quality setting, but the audio file may be too large to copy to the removable medium at the highest setting (i.e., depending on the amount of existing digital content on the removable medium).

Using the maximum quality setting, the interactive television application may determine the highest possible quality for the audio. The interactive television application may determine the amount of space available on the removable medium prior to transferring the audio file. The interactive television application may transcode the audio file such that the quality setting is as high as possible to fit on the removable medium. For example, the interactive television application may determine that an audio file may be resampled at a slightly lower rate to be able to fit on the removable medium. Similarly, if the maximum quality setting is selected for a video file, the interactive television application may select a resolution that is as high as possible (or a compression rate that is as small as possible) to transfer the video file to the removable medium. In some embodiments, for the maximum quality setting, the quality of the digital content may be limited, such that the digital content does not occupy more than a user-defined percentage of the remaining capacity on the removable medium.

The interactive television application may display radio buttons 925 and 926 if the selected digital content is recurring (e.g., a series recording or weekly program listings, etc.). The interactive television application may allow the user to select the manner in which such recurring digital content is transferred.

In response to the user selecting radio button 925, the interactive television application may be configured to transfer the most recent version of the recurring digital content to removable media. For example, the interactive television application may perform a series recording of "NBC Nightly News" on a daily basis. If the user forgets to transfer the program to removable media on Wednesday, then on Thursday, the interactive television application may transfer only the recording for Thursday because the user may not be interested in viewing dated material.

In response to the user selecting radio button 926, the interactive television application may be configured to transfer all recordings of the recurring digital content that have not yet been transferred to removable media. For example, the interactive television application may perform a series recording of "Jeopardy" on a daily basis. If the user goes away on vacation, the interactive television application may record several episodes of "Jeopardy" and none of the episodes may be transferred to removable media. When the user returns from vacation, the interactive television application may transfer all the episodes of "Jeopardy" that aired while the user was away on vacation.

Update settings area 930 may include settings for updating digital content stored on removable media. For example, by selecting checkbox 960, the user may instruct the interactive television application to overwrite (or delete) digital content older than a user-specified number of days.

In another example, by selecting checkbox 965, the user may instruct the interactive television application to overwrite (or delete) digital content once it has been viewed by the user. Information regarding the status of digital content, such as whether digital content has been viewed, may be stored in a file or registry on the removable medium. For example, if the user views digital content stored on a removable medium from a handheld device, the handheld device may update a file stored on the removable medium to indicate that the digital content has been viewed. The next time the user places the removable medium in communication with set-top box 60, the interactive television application may determine that the digital content was viewed.

If the user does not select either checkbox 960 or checkbox 965, the interactive television application may consider the selected digital content as marked to be saved. Therefore, the interactive television application may not delete or overwrite the selected digital content after it has been transferred to removable media unless instructed otherwise by the user.

In some embodiments, update settings may apply only when a removable medium lacks the capacity to store additional digital content. For example, the interactive television application may overwrite or delete existing digital content to make room for additional digital content.

In some embodiments, if recurring digital content has been selected for transfer to removable media, the recurring digital content may replace older versions of the recurring digital content in accordance with the user's selections in checkboxes 960 and 965. For example, if the user selects checkbox 965, the current recording of "NBC Evening News" may overwrite a previous recording of "NBC Evening News" stored on removable media that has been viewed by the user.

Removable media selection area 935 may include a listing of ranges of storage capacities for removable media and a listing of known removable media. The purpose of allowing the user to select ranges of storage capacities for removable media is to ensure that the selected removable media have sufficient capacity to store the digital content.

For example, if the user configures the interactive television application to perform a future transfer of "The Rock" to removable media in high resolution, the selected removable media should have sufficient capacity to store the digital content. In this example, the user may select checkbox 970, which indicates that the selected digital content should only be transferred to removable media with capacities over 1 GB.

The user may also select check box 995 and select from drop-down menu 997 a specific removable medium to which the digital content may be transferred (e.g., a DVD-R). The interactive television application may store a database of known removable media in order to maintain such a listing. In some embodiments, the known removable media may be referenced by an identifier (e.g., volume number).

After the user has finished selecting the settings from screen 900, the user may select save button 840 to save the settings. The user may also select cancel button 945 to exit screen 900. When the user saves the settings, the interactive television application may be configured to perform a future transfer of the selected digital content to removable media in accordance with the settings. For example, the next time the user inserts a removable medium into set-top box 60 (or otherwise places the removable medium in communication with set-top box 60), the interactive television application may transfer the selected digital content to the removable medium without requiring any further user interaction.

In some embodiments, the interactive television application may process (e.g., transcode) the selected digital content in accordance with the quality and format settings when digital content becomes available. For example, if the user selects digital content for a future transfer to removable media, the interactive television application may immediately process the digital content in anticipation of performing a future transfer of the digital content. This prevents the interactive television application from having to process the digital content just prior to transfer, which saves the user from waiting for the digital content to be processed. In another example, if the user selects recurring digital content for a future transfer to removable media, the interactive television application may process (e.g., transcode) the recurring digital content as soon as it is recorded by the interactive television application.

Figure 10:
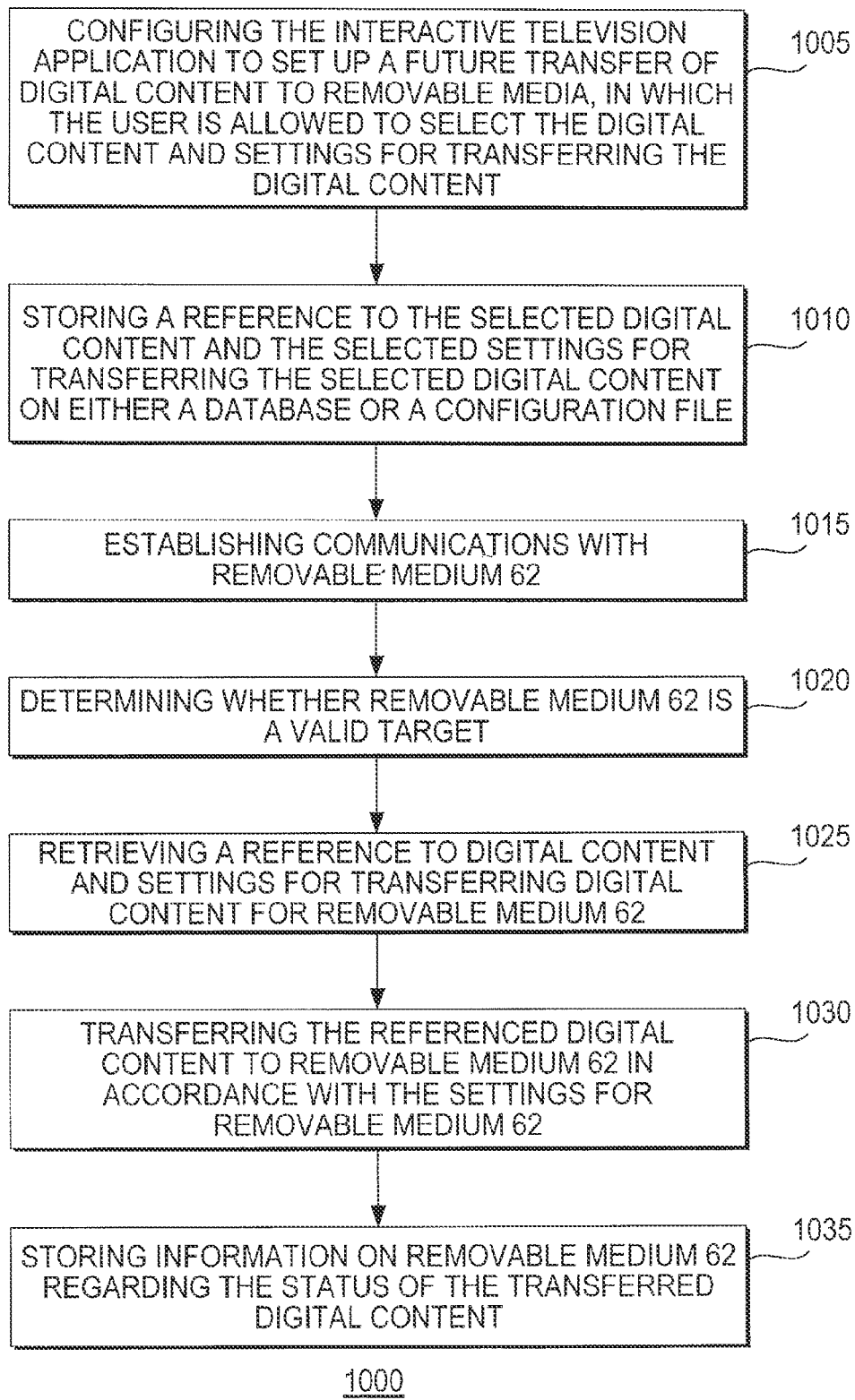
FIG. 10 is an illustrative flow diagram for transferring digital content to removable media in accordance with the present invention.

FIG. 10 is an illustrative flow diagram for transferring digital content to removable media in accordance with the present invention.

At step 1005, the interactive television application may be configured to perform a future transfer of digital content to removable media. Screen 900 (FIG. 9) is an illustrative screen for configuring the interactive television application to perform a future transfer of digital content to removable media. As shown in FIG. 9, the interactive television application may allow the user to select digital content for transferring to removable media. The interactive television application may also allow the user to select settings for performing the transfer.

At step 1010, the interactive television application may store a reference to the selected digital content and the selected settings for transferring the selected digital content.

In some embodiments, the reference to the selected digital content and the selected settings for transferring the selected digital content may be stored on a database accessible by the interactive television application. The database may include different entries for different removable media. For example, the user may select to transfer "The Simpsons" to all removable media having a capacity greater than 500 MB and "The Rock" to a particular DVD-R. The database entry for the DVD-R may indicate that both "The Simpsons" and "The Rock" are digital content to be transferred. On the other hand, the database entries for other removable media with capacities greater than 500 MB may indicate that "The Simpsons" is digital content to be transferred. Therefore, the entries for the removable media stored in the database may vary because of different digital content selected to be transferred to the removable media.

In some embodiments, the reference to the selected digital content and the selected settings for transferring the selected digital content may be stored on a configuration file stored on a removable medium (e.g., removable medium 62). In some embodiments, the interactive television application may create and transfer the configuration file to the removable medium. In some embodiments, the interactive television application may transfer the configuration file to a removable medium at the time the settings for the removable medium are created (e.g., by prompting the user to insert the removable medium). In some embodiments, the interactive television application may copy the configuration file to the removable medium the next time the removable medium is used with set-top box 60.

In some embodiments, the configuration file may be generated by a source other than the interactive television application. For example, a website may be accessed from a computer, which allows the user to select settings for performing future transfers of digital content. The website may create a configuration file based on the user's selections and the computer may copy the configuration file onto the removable medium.

At step 1015, the interactive television application may establish communications with removable medium 62. For example, the interactive television application may establish communications with removable medium 62 when removable medium 62 is inserted into set-top box 60 or a device coupled to set-top box 60. In another example, the interactive television application may establish communications with removable medium 62 over a wireless link. The wireless link may be created when removable medium 62 is moved in close proximity to a wireless access point that is a part of or coupled to set-top box 60.

At step 1020, the interactive television application may determine whether removable medium 62 is a valid target. The determination may occur without requiring further user interaction. The interactive television application may determine that removable medium 62 is a valid target prior to transferring digital content to removable medium 62.

In some embodiments, the interactive television application may refer to the database discussed above to determine whether settings for removable medium 62 are stored on the database. For example, the interactive television application may determine the identifier for removable medium 62 and check the database to see if any entries are stored in the database under the identifier for removable medium 62. Identifiers may include, for example, volume numbers and capacities. If the settings for removable medium 62 are stored on the database, then the interactive television application may assume that removable medium 62 is a valid target.

In some embodiments, the interactive television application may reference the configuration file discussed above to determine whether removable medium 62 is a valid target. For example, if the interactive television application recognizes the settings for removable medium 62 on the configuration file, then the interactive television application may assume that removable medium 62 is a valid target.

If removable medium 62 is not recognized by the interactive television application, the interactive television application may determine whether removable medium 62 is a valid target. For example, the interactive television application may attempt to transfer a small file to removable medium 62 to determine whether it is capable of storing digital content. The interactive television application may also attempt to determine the available storage capacity on removable medium 62.

If the interactive television application determines that removable medium 62 is a valid target, the interactive television application may recognize removable medium 62 as a valid target the next time it is placed in communication with set-top box 60. In some embodiments, the interactive television application may create an entry for removable medium 62 in the database. In some embodiments, the interactive television application may copy a configuration file with a default set of settings to removable medium 62.

If the interactive television application determines that removable medium 62 is not a valid target, the interactive television application may activate a red indicator light on set-top box 60. For example, if the user mistakenly inserts a plain CD into set-top box 60 (as opposed to a CD-R or CD-RW), the interactive television application may determine that the plain CD is not a valid target.

At step 1025, the interactive television application may retrieve a reference to digital content and settings for transferring digital content for removable medium 62 from either the database or the configuration file. The retrieval may occur without requiring any further user interaction.

In some embodiments, if removable medium 62 is not recognized by the interactive television application, the interactive television application may retrieve a reference to digital content and settings for transferring the digital content for removable media with capacities similar to that of removable medium 62. For example, the user may have configured the interactive television application to transfer certain digital content in a certain manner to all removable media with capacities greater than 100 MB.

At step 1030, the interactive television application may transfer the referenced digital content to removable medium 62 in accordance with the settings for removable medium 62. The transfer may occur without requiring further user interaction.

The interactive television application may transcode the referenced digital content in accordance with the settings for removable medium 62. For example, the interactive television application may transcode a video into MPEG file with a 320×240 resolution. In some embodiments, the interactive television application may transcode the referenced digital content in advance of the transfer (i.e., to reduce the amount of time required to transfer the digital content). In some embodiments, the interactive television application may transcode the referenced digital content immediately prior to transferring the digital content.

In some embodiments, if removable medium 62 is unable to overwrite or delete any existing digital content to store additional digital content (e.g., because of the settings), the interactive television application may transfer as much content as possible to removable medium 62. The interactive television application may indicate to the user that the transfer was incomplete by activating, for example, a yellow indicator light on set-top box 60. In some embodiments, if removable medium 62 is unable to overwrite or delete any existing digital content to store additional digital content, the interactive television application may require user input (e.g., to indicate which existing digital content to delete) before transferring any content to removable medium 62.

If the transfer of digital content to removable medium 62 is successful, the interactive television application may activate, for example, a green indicator light on set-top box 60.

At step 1035, information may be stored on removable medium 62 regarding the status of the transferred digital content. For example, when the digital content is accessed by a handheld device, the handheld device may store information regarding the status of the digital content on removable medium 62. For example, the handheld device may store information on removable medium 62 to indicate that the digital content was viewed. In some embodiments, the information may be stored on the configuration file, discussed above. In some embodiments, the interactive television application may update the database entry for removable medium 62 to include the status of the digital content when removable medium 62 is placed in communication with set-top box 60.

If the digital content is stored on a remote server accessible by the interactive television application, the interactive television application may send a request to the remote server to transfer the digital content to set-top box 60 for processing.

In some embodiments, the request may be sent immediately after the user configures the interactive television application to perform a future transfer of digital content. The interactive television application may request that the remote server automatically transfer recurring digital content to set-top box 60 as it becomes available. This approach may reduce the amount of time it takes for the digital content to be transferred to removable medium 62 because at the time removable medium 62 is placed in communication with set-top box 60, the digital content is already stored on set-top box 60.

In some embodiments, the request may be sent after the user places removable medium 62 in communication with set-top box 60. In this approach, set-top box 60 is not required to store the digital content for long periods of time until the user initiates a transfer of digital content to removable medium 62. Therefore, disk space is not unnecessarily occupied by the digital content prior to the digital content being transferred to removable medium 62.

In some embodiments, the user may configure the interactive television application to perform a future transfer of digital content, which occurs in response to the user touching, for example, a button on set-top box 60 (e.g., a one-touch transfer). In configuring the interactive television application to perform a future one-touch transfer, the interactive television application may allow the user to select digital content to be transferred and settings for performing the transfer.

Each time the user places removable medium 62 in communication with set-top box 60 and initiates the one-touch transfer, the interactive television application may transfer the digital content to removable medium 62. This approach does not require the use of a database or a configuration file to store customized settings, instead the digital content and settings are the same for all types of removable media placed in communication with set-top box 60.

The foregoing is merely illustrative of the principles of this invention and various modifications can be made by those skilled in the art without departing from the scope and spirit of the invention.

What is claimed is:

1. A method for transferring audio from a program to a removable medium, the method comprising:
receiving a user input to set up a future transfer of the audio from the program to the removable medium, the program including the audio and video, and without requiring any further user interaction after the user input:
recording, with a control circuitry, the program including the audio and the video;
extracting, by the control circuitry, a portion of the audio only from the recorded program; and
transferring, with the control circuitry, the portion of the audio of the program to the removable medium.

2. The method of claim 1, wherein receiving the user input to set up the future transfer of the audio from the program to the removable medium further comprises receiving a user selection of a setting for transferring the audio to the removable medium.

3. The method of claim 1, further comprising determining, by the control circuitry, whether the removable medium is a valid target, wherein the determination is made without requiring any further user input after the user input to set up the future transfer.

4. The method of claim 1, wherein information regarding whether the audio has been played is stored on the removable medium.

5. The method of claim 1, further comprising:
storing a reference to the program in a database; and
retrieving the reference to the program from the database after establishing the communications link with the removable medium, wherein the reference is retrieved without requiring any further user interaction after the user input to set up the future transfer.

6. The method of claim 1, further comprising:
storing a reference to the program in a configuration file stored on the removable medium; and
retrieving the reference to the program from the configuration file after establishing the communications link with the removable medium, wherein the reference is retrieved without requiring any further user interaction after the user input to set up the future transfer.

7. A system for transferring audio from a program to a removable medium, the system comprising control circuitry configured to:
receive a user input to set up a future transfer of the audio from the program to the removable medium, the program including the audio and video, and without requiring any further user interaction after the user input:
record the program including the audio and the video;
extract a portion of the audio only from the recorded program; and
transfer the portion of the audio of the program to the removable medium.

8. The system of claim 7, wherein the control circuitry configured to receive the user input to set up the future transfer of the audio from the program to the removable medium is further configured to receive a user selection of a setting for transferring the audio to the removable medium.

9. The system of claim 7, wherein the control circuitry is further configured to determine whether the removable medium is a valid target, wherein the determination is made without requiring any further user input after the user input to set up the future transfer.

10. The system of claim 7, wherein information regarding whether the audio has been played is stored on the removable medium.

11. The system of claim 7 wherein the control circuitry is further configured to:
store a reference to the program in a database; and
retrieve the reference to the program from the database after establishing the communications link with the removable medium, wherein the reference is retrieved without requiring any further user interaction after the user input to set up the future transfer.

12. The system of claim 7, wherein the control circuitry is further configured to:
store a reference to the program in a configuration file stored on the removable medium; and
retrieve the reference to the program from the configuration file after establishing the communications link with the removable medium, wherein the reference is retrieved without requiring any further user interaction after the user input to set up the future transfer.

13. Non-transitory machine-readable media for transferring audio from a program to a removable medium, the machine-readable media comprising machine-readable instructions recorded thereon for:
receiving a user input to set up a future transfer of the audio from the program to the removable medium, the program including the audio and video, and without requiring any further user interaction after the user input:
recording the program including the audio and the video;
extracting a portion of the audio only from the recorded program; and
transferring the portion of the audio of the program to the removable medium.

14. The machine-readable media of claim 13, wherein receiving the user input to set up the future transfer of the audio from the program to the removable medium further comprises receiving a user selection of a setting for transferring the audio to the removable medium.

15. The machine-readable media of claim 13, further comprising machine readable instructions recorded thereon for determining whether the removable medium is a valid target, wherein the determination is made without requiring any further user input after the user input to set up the future transfer.

16. The machine-readable media of claim 13, wherein information regarding whether the audio has been played is stored on the removable medium.

17. The machine-readable media of claim 13, further comprising machine readable instructions recorded thereon for:

storing a reference to the program in a database; and
retrieving the reference to the program from the database after establishing the communications link with the removable medium, wherein the reference is retrieved without requiring any further user interaction after the user input to set up the future transfer.

18. The machine-readable media of claim 13, further comprising machine readable instructions recorded thereon for:
storing a reference to the program in a configuration file stored on the removable medium; and
retrieving the reference to the program from the configuration file after establishing the communications link with the removable medium, wherein the reference is retrieved without requiring any further user interaction after the user input to set up the future transfer.

\* \* \* \* \*